(12) United States Patent
Meir et al.

(10) Patent No.: US 8,579,466 B2
(45) Date of Patent: *Nov. 12, 2013

(54) ILLUMINATION APPARATUS AND METHODS OF FORMING THE SAME

(75) Inventors: Noam Meir, Hezlia (IL); Eran Fine, Tel-Aviv (IL)

(73) Assignee: Oree, Inc., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,976

(22) Filed: Aug. 24, 2012

(65) Prior Publication Data
US 2013/0043782 A1 Feb. 21, 2013

Related U.S. Application Data

(63) Continuation of application No. 12/491,707, filed on Jun. 25, 2009, now Pat. No. 8,272,758, which is a continuation-in-part of application No. 12/324,134, filed on Nov. 26, 2008, now Pat. No. 8,215,815, which is a continuation-in-part of application No. 11/921,305, filed as application No. PCT/IL2006/000667 on Jul. 7, 2006, now Pat. No. 8,128,272.

(60) Provisional application No. 60/687,865, filed on Jun. 7, 2005, provisional application No. 61/076,427, filed on Jun. 27, 2008, provisional application No. 61/135,098, filed on Jul. 16, 2008, provisional application No. 61/217,576, filed on Jun. 2, 2009, provisional application No. 61/220,024, filed on Jun. 24, 2009.

(51) Int. Cl.
*F21V 9/16* (2006.01)

(52) U.S. Cl.
USPC ............ 362/231; 362/230; 362/606; 362/608

(58) Field of Classification Search
USPC .................................. 362/230, 231, 606–608
See application file for complete search history.

(56) References Cited

U.S. PATENT DOCUMENTS

| | | |
|---|---|---|
| 3,261,356 A | 7/1966 | Wallace |
| 3,626,471 A | 12/1971 | Florin |
| 3,871,747 A | 3/1975 | Andrews |
| 3,995,934 A | 12/1976 | Nath et al. |
| 4,551,129 A | 11/1985 | Coleman et al. |

(Continued)

FOREIGN PATENT DOCUMENTS

| | | |
|---|---|---|
| CN | 2593229 | 12/2003 |
| CN | 1321344 | 6/2007 |

(Continued)

OTHER PUBLICATIONS

Allen et al., "A nearly ideal phosphor-converted while light-emitting diode" *Appl. Phys. Ltrs.* 71:143309 (2006).

(Continued)

*Primary Examiner* — Anabel Ton
(74) *Attorney, Agent, or Firm* — Bingham McCutchen LLP

(57) ABSTRACT

In one aspect, an illumination apparatus includes a waveguide, embedded in which are a light-emitting source and a photoluminescent material. Output light is emitted from at least a portion of a first surface of the waveguide. The photoluminescent material includes nano-size phosphor particles and/or quantum dots.

28 Claims, 10 Drawing Sheets

(56) References Cited

U.S. PATENT DOCUMENTS

| | | |
|---|---|---|
| 4,669,467 A | 6/1987 | Willett et al. |
| 4,714,983 A | 12/1987 | Lang |
| 4,762,381 A | 8/1988 | Uemiya et al. |
| 4,783,140 A | 11/1988 | Osawa et al. |
| 4,829,192 A | 5/1989 | Kokubu et al. |
| 4,853,593 A | 8/1989 | Stein et al. |
| 4,872,837 A | 10/1989 | Issalene et al. |
| 4,878,072 A | 10/1989 | Reinten |
| 4,903,172 A | 2/1990 | Schoniger et al. |
| 4,906,062 A | 3/1990 | Young et al. |
| 5,009,483 A | 4/1991 | Rockwell, III |
| 5,048,913 A | 9/1991 | Glenn et al. |
| 5,061,032 A | 10/1991 | Meltz et al. |
| 5,139,420 A | 8/1992 | Walker |
| 5,152,686 A | 10/1992 | Duggan et al. |
| 5,165,187 A | 11/1992 | Shahidi-Hamedani et al. |
| 5,211,467 A | 5/1993 | Seder |
| 5,281,134 A | 1/1994 | Schultz |
| 5,425,730 A | 6/1995 | Luloh |
| 5,535,105 A | 7/1996 | Koenen et al. |
| 5,559,358 A | 9/1996 | Burns et al. |
| 5,569,254 A | 10/1996 | Carlson et al. |
| 5,580,154 A | 12/1996 | Coulter et al. |
| 5,596,671 A | 1/1997 | Rockwell, III |
| 5,675,678 A | 10/1997 | Neuberger et al. |
| 5,718,666 A | 2/1998 | Alarcon |
| 5,813,752 A | 9/1998 | Singer et al. |
| 5,813,753 A | 9/1998 | Vriens et al. |
| 5,847,507 A | 12/1998 | Butterworth et al. |
| 5,899,552 A | 5/1999 | Yokoyama et al. |
| 5,947,588 A | 9/1999 | Huang |
| 5,959,316 A | 9/1999 | Lowery |
| 5,969,869 A | 10/1999 | Hirai et al. |
| 6,016,038 A | 1/2000 | Mueller et al. |
| 6,031,511 A | 2/2000 | DeLuca et al. |
| 6,079,838 A | 6/2000 | Parker et al. |
| 6,097,871 A | 8/2000 | De Dobbelaere et al. |
| 6,155,699 A | 12/2000 | Miller et al. |
| 6,226,440 B1 | 5/2001 | Lyons |
| 6,275,512 B1 | 8/2001 | Fermann |
| 6,278,106 B1 | 8/2001 | Muto et al. |
| 6,322,225 B1 | 11/2001 | Koike et al. |
| 6,329,444 B1 | 12/2001 | McGlothlin et al. |
| 6,345,903 B1 | 2/2002 | Koike et al. |
| 6,350,041 B1 | 2/2002 | Tarsa et al. |
| 6,351,069 B1 | 2/2002 | Lowery et al. |
| 6,356,691 B2 | 3/2002 | Seong-jin et al. |
| 6,357,889 B1 | 3/2002 | Duggal et al. |
| 6,408,123 B1 | 6/2002 | Kuroda et al. |
| 6,417,616 B2 | 7/2002 | Lee |
| 6,473,554 B1 | 10/2002 | Pelka et al. |
| 6,488,704 B1 | 12/2002 | Connelly et al. |
| 6,491,443 B1 | 12/2002 | Serizawa et al. |
| 6,501,100 B1 | 12/2002 | Srivastava et al. |
| 6,501,102 B2 | 12/2002 | Mueller-Mach et al. |
| 6,504,301 B1 | 1/2003 | Lowery |
| 6,522,065 B1 | 2/2003 | Srivastava et al. |
| 6,522,794 B1 | 2/2003 | Bischel et al. |
| 6,527,419 B1 | 3/2003 | Galli |
| 6,528,755 B2 | 3/2003 | Grewell et al. |
| 6,530,670 B2 | 3/2003 | Hirayama et al. |
| 6,549,709 B1 | 4/2003 | De Dobbelaere et al. |
| 6,551,346 B2 | 4/2003 | Crossley |
| 6,554,462 B2 | 4/2003 | Hulse et al. |
| 6,599,000 B2 | 7/2003 | Nolan et al. |
| 6,608,332 B2 | 8/2003 | Shimizu et al. |
| 6,614,179 B1 | 9/2003 | Shimizu et al. |
| 6,621,211 B1 | 9/2003 | Srivastava et al. |
| 6,635,363 B1 | 10/2003 | Duclos et al. |
| 6,635,987 B1 | 10/2003 | Wojnarowski et al. |
| 6,637,924 B2 | 10/2003 | Pelka et al. |
| 6,654,532 B1 | 11/2003 | Tomaru et al. |
| 6,671,235 B1 | 12/2003 | Hawryluk et al. |
| 6,680,004 B2 | 1/2004 | Ono et al. |
| 6,687,010 B1 | 2/2004 | Horii et al. |
| 6,694,069 B2 | 2/2004 | Kaneko et al. |
| 6,709,132 B2 | 3/2004 | Ishibashi |
| 6,714,711 B1 | 3/2004 | Lieberman et al. |
| 6,754,408 B2 | 6/2004 | Toda et al. |
| 6,765,237 B1 | 7/2004 | Doxsee et al. |
| 6,796,698 B2 | 9/2004 | Sommers et al. |
| 6,817,735 B2 | 11/2004 | Shimizu et al. |
| 6,847,170 B2 | 1/2005 | Kayser |
| 6,850,665 B2 | 2/2005 | Grubsky et al. |
| 6,853,131 B2 | 2/2005 | Srivastava et al. |
| 6,871,982 B2 | 3/2005 | Holman et al. |
| 6,890,234 B2 | 5/2005 | Bortscheller et al. |
| 6,908,205 B2 | 6/2005 | Greiner et al. |
| 6,917,057 B2 | 7/2005 | Stokes et al. |
| 6,939,481 B2 | 9/2005 | Srivastava et al. |
| 6,941,069 B2 | 9/2005 | Kaneko et al. |
| 6,943,380 B2 | 9/2005 | Ota et al. |
| 6,948,829 B2 | 9/2005 | Verdes et al. |
| 6,965,709 B1 | 11/2005 | Weiss |
| 6,982,522 B2 | 1/2006 | Omoto et al. |
| 7,005,086 B2 | 2/2006 | Matsuno |
| 7,006,306 B2 | 2/2006 | Falicoff et al. |
| 7,008,078 B2 | 3/2006 | Shimizu et al. |
| 7,015,510 B2 | 3/2006 | Srivastava et al. |
| 7,026,756 B2 | 4/2006 | Shimizu et al. |
| 7,038,246 B2 | 5/2006 | Uemura |
| 7,045,826 B2 | 5/2006 | Kim et al. |
| 7,052,152 B2 | 5/2006 | Harbers et al. |
| 7,052,153 B2 | 5/2006 | Kawashima et al. |
| 7,063,450 B2 | 6/2006 | Ehara et al. |
| 7,066,623 B2 | 6/2006 | Lee et al. |
| 7,068,898 B2 | 6/2006 | Buretea et al. |
| 7,071,616 B2 | 7/2006 | Shimizu et al. |
| 7,086,767 B2 | 8/2006 | Sidwell et al. |
| 7,123,796 B2 | 10/2006 | Steckl et al. |
| 7,144,131 B2 | 12/2006 | Rains |
| 7,153,008 B2 | 12/2006 | Grote, III et al. |
| 7,168,842 B2 | 1/2007 | Chou et al. |
| 7,178,941 B2 | 2/2007 | Roberge et al. |
| 7,178,942 B2 | 2/2007 | Chen et al. |
| 7,193,248 B2 | 3/2007 | Weindorf et al. |
| 7,204,607 B2 | 4/2007 | Yano et al. |
| 7,215,086 B2 | 5/2007 | Maxik |
| 7,218,824 B2 | 5/2007 | Franklin et al. |
| 7,221,110 B2 | 5/2007 | Sears et al. |
| 7,230,222 B2 | 6/2007 | Cheng et al. |
| 7,251,389 B2 | 7/2007 | Lu et al. |
| 7,259,403 B2 | 8/2007 | Shimizu et al. |
| 7,267,787 B2 | 9/2007 | Dong et al. |
| 7,279,832 B2 | 10/2007 | Thurk et al. |
| 7,288,797 B2 | 10/2007 | Deguchi et al. |
| 7,293,906 B2 | 11/2007 | Mok et al. |
| 7,311,431 B2 | 12/2007 | Chew et al. |
| 7,318,651 B2 | 1/2008 | Chua et al. |
| 7,331,700 B2 | 2/2008 | Zhang |
| 7,345,317 B2 | 3/2008 | Reeh et al. |
| 7,347,586 B2 | 3/2008 | Izardel |
| 7,350,936 B2 | 4/2008 | Ducharme et al. |
| 7,367,692 B2 | 5/2008 | Maxik |
| 7,375,381 B2 | 5/2008 | Shimizu et al. |
| 7,378,686 B2 | 5/2008 | Beeson et al. |
| 7,382,091 B2 | 6/2008 | Chen et al. |
| 7,391,060 B2 | 6/2008 | Oshio |
| 7,396,142 B2 | 7/2008 | Laizure, Jr. et al. |
| 7,399,108 B2 | 7/2008 | Ayabe et al. |
| 7,425,798 B2 | 9/2008 | St.-Germain |
| 7,430,355 B2 | 9/2008 | Heikenfeld et al. |
| 7,433,565 B2 | 10/2008 | Joseph et al. |
| 7,434,940 B2 | 10/2008 | Allman et al. |
| 7,465,961 B2 | 12/2008 | Masuda et al. |
| 7,479,733 B2 | 1/2009 | Chang et al. |
| 7,513,669 B2 | 4/2009 | Chua et al. |
| 7,537,947 B2 | 5/2009 | Smith et al. |
| 7,585,083 B2 | 9/2009 | Kim et al. |
| 7,597,470 B2 | 10/2009 | Kurihara et al. |
| 7,607,815 B2 | 10/2009 | Pang |
| 7,627,018 B1 | 12/2009 | Guilfoyle et al. |
| 7,635,203 B2 | 12/2009 | Weaver, Jr. et al. |
| 7,638,754 B2 | 12/2009 | Morimoto et al. |

(56) References Cited

U.S. PATENT DOCUMENTS

| | | |
|---|---|---|
| 7,639,916 B2 | 12/2009 | Fine |
| 7,654,687 B2 | 2/2010 | Tsai et al. |
| 7,661,841 B2 | 2/2010 | Kurihara et al. |
| 7,690,803 B2 | 4/2010 | Miyashita et al. |
| 7,717,589 B2 | 5/2010 | Nishioka et al. |
| 7,719,022 B2 | 5/2010 | Maeda et al. |
| 7,722,211 B2 | 5/2010 | Marra et al. |
| 7,736,042 B2 | 6/2010 | Park, II et al. |
| 7,736,044 B2 | 6/2010 | Chew et al. |
| 7,738,054 B2 | 6/2010 | Okumura et al. |
| 7,791,683 B2 | 9/2010 | Larson et al. |
| 7,826,698 B1 | 11/2010 | Meir et al. |
| 7,845,839 B2 | 12/2010 | Collier |
| 7,891,852 B2 | 2/2011 | Pugh et al. |
| 7,903,198 B2 | 3/2011 | Abe et al. |
| 7,929,816 B2 | 4/2011 | Meir et al. |
| 7,942,546 B2 | 5/2011 | Naijo et al. |
| 7,991,257 B1 | 8/2011 | Coleman et al. |
| 8,033,706 B1 | 10/2011 | Kelly et al. |
| 8,064,743 B2 | 11/2011 | Meir et al. |
| 8,128,272 B2 * | 3/2012 | Fine et al. ............ 362/606 |
| 8,215,815 B2 * | 7/2012 | Meir et al. ............ 362/606 |
| 8,272,758 B2 * | 9/2012 | Meir et al. ............ 362/231 |
| 2001/0046142 A1 | 11/2001 | Van Santen et al. |
| 2001/0053072 A1 | 12/2001 | Takemoto |
| 2002/0097962 A1 | 7/2002 | Yoshimura et al. |
| 2002/0118907 A1 | 8/2002 | Sugama et al. |
| 2002/0122629 A1 | 9/2002 | Grubsky et al. |
| 2003/0156425 A1 | 8/2003 | Turnbull et al. |
| 2003/0198455 A1 | 10/2003 | Usami |
| 2004/0012556 A1 | 1/2004 | Yong et al. |
| 2004/0196648 A1 | 10/2004 | Franklin et al. |
| 2004/0246687 A1 | 12/2004 | Abe et al. |
| 2004/0257352 A1 | 12/2004 | Naugler et al. |
| 2005/0041424 A1 | 2/2005 | Ducharme |
| 2005/0088586 A1 | 4/2005 | Mori et al. |
| 2005/0100288 A1 | 5/2005 | Chu |
| 2005/0116667 A1 | 6/2005 | Mueller et al. |
| 2005/0243243 A1 | 11/2005 | Koganezawa |
| 2005/0258432 A1 | 11/2005 | Cho |
| 2005/0265403 A1 | 12/2005 | Anderson et al. |
| 2006/0001036 A1 | 1/2006 | Jacob et al. |
| 2006/0001037 A1 | 1/2006 | Schardt et al. |
| 2006/0002146 A1 | 1/2006 | Baba |
| 2006/0008205 A1 | 1/2006 | Meir et al. |
| 2006/0012286 A1 | 1/2006 | Cull et al. |
| 2006/0092346 A1 | 5/2006 | Moon et al. |
| 2006/0098434 A1 | 5/2006 | Liu et al. |
| 2006/0131924 A1 | 6/2006 | Reck |
| 2006/0164840 A1 | 7/2006 | Song et al. |
| 2006/0170332 A1 | 8/2006 | Tamaki et al. |
| 2006/0193133 A1 | 8/2006 | Von Der Brelie |
| 2006/0203502 A1 | 9/2006 | Stevens et al. |
| 2006/0208670 A1 | 9/2006 | Chang et al. |
| 2006/0221610 A1 | 10/2006 | Chew et al. |
| 2006/0227085 A1 | 10/2006 | Boldt et al. |
| 2006/0245213 A1 | 11/2006 | Beil et al. |
| 2006/0262250 A1 | 11/2006 | Hobbs |
| 2006/0262564 A1 | 11/2006 | Baba |
| 2006/0268537 A1 | 11/2006 | Kurihara et al. |
| 2006/0273337 A1 | 12/2006 | Han et al. |
| 2006/0290253 A1 | 12/2006 | Yeo et al. |
| 2007/0019439 A1 | 1/2007 | Yu et al. |
| 2007/0031097 A1 | 2/2007 | Heikenfeld et al. |
| 2007/0052929 A1 | 3/2007 | Allman et al. |
| 2007/0053208 A1 | 3/2007 | Justel et al. |
| 2007/0057626 A1 | 3/2007 | Kurihara et al. |
| 2007/0086211 A1 | 4/2007 | Beeson et al. |
| 2007/0086812 A1 | 4/2007 | Iio et al. |
| 2007/0097321 A1 | 5/2007 | Whitehead et al. |
| 2007/0103914 A1 | 5/2007 | McCaffrey |
| 2007/0133210 A1 | 6/2007 | Watson et al. |
| 2007/0133935 A1 | 6/2007 | Fine |
| 2007/0138966 A1 | 6/2007 | Marka et al. |
| 2007/0147089 A1 | 6/2007 | Lin et al. |
| 2007/0164495 A1 | 7/2007 | Monti |
| 2007/0187710 A1 | 8/2007 | Steen et al. |
| 2007/0188425 A1 | 8/2007 | Saccomanno |
| 2007/0274094 A1 | 11/2007 | Schultz et al. |
| 2007/0284600 A1 | 12/2007 | Shchekin et al. |
| 2007/0297179 A1 | 12/2007 | Leung et al. |
| 2008/0007541 A1 | 1/2008 | Eliasson et al. |
| 2008/0029720 A1 | 2/2008 | Li |
| 2008/0049445 A1 | 2/2008 | Harbers et al. |
| 2008/0055931 A1 | 3/2008 | Verstraete et al. |
| 2008/0061683 A1 | 3/2008 | Bertram |
| 2008/0094348 A1 | 4/2008 | Yin et al. |
| 2008/0122365 A1 | 5/2008 | Decius et al. |
| 2008/0129927 A1 | 6/2008 | Hamada et al. |
| 2008/0144333 A1 | 6/2008 | Gourlay |
| 2008/0151576 A1 | 6/2008 | Inditsky |
| 2008/0174999 A1 | 7/2008 | Chiang et al. |
| 2008/0186736 A1 | 8/2008 | Rinko |
| 2008/0192458 A1 | 8/2008 | Li |
| 2008/0205080 A1 | 8/2008 | Erchak et al. |
| 2008/0212315 A1 | 9/2008 | Cornelissen et al. |
| 2008/0218993 A1 | 9/2008 | Li |
| 2008/0225522 A1 | 9/2008 | Ito et al. |
| 2008/0239749 A1 | 10/2008 | Saccomanno et al. |
| 2008/0251690 A1 | 10/2008 | Keiper et al. |
| 2008/0252571 A1 | 10/2008 | Hente et al. |
| 2008/0297644 A1 | 12/2008 | Farchtchian et al. |
| 2008/0305439 A1 | 12/2008 | Khan |
| 2008/0316605 A1 | 12/2008 | Hazell et al. |
| 2009/0001397 A1 | 1/2009 | Fine et al. |
| 2009/0002668 A1 | 1/2009 | Rohe et al. |
| 2009/0016060 A1 | 1/2009 | Nakao |
| 2009/0027588 A1 | 1/2009 | Medendorp, Jr. et al. |
| 2009/0046453 A1 | 2/2009 | Kramer |
| 2009/0046978 A1 | 2/2009 | Yasuda et al. |
| 2009/0051268 A1 | 2/2009 | You et al. |
| 2009/0052205 A1 | 2/2009 | Chen et al. |
| 2009/0059359 A1 | 3/2009 | Nahm et al. |
| 2009/0059553 A1 | 3/2009 | Lin |
| 2009/0067194 A1 | 3/2009 | Sanchez |
| 2009/0080830 A1 | 3/2009 | Matsuoka et al. |
| 2009/0116801 A1 | 5/2009 | Fine |
| 2009/0129115 A1 | 5/2009 | Fine et al. |
| 2009/0141476 A1 | 6/2009 | Meir et al. |
| 2009/0161340 A1 | 6/2009 | Huang et al. |
| 2009/0161341 A1 | 6/2009 | Meir et al. |
| 2009/0161361 A1 | 6/2009 | Meir et al. |
| 2009/0161369 A1 | 6/2009 | Regev et al. |
| 2009/0161383 A1 | 6/2009 | Meir et al. |
| 2009/0162015 A1 | 6/2009 | Meir et al. |
| 2009/0168395 A1 | 7/2009 | Mrakovich et al. |
| 2009/0201955 A1 | 8/2009 | Weigl et al. |
| 2009/0212718 A1 | 8/2009 | Kawashima et al. |
| 2009/0225566 A1 | 9/2009 | Zimmermann et al. |
| 2009/0236620 A1 | 9/2009 | Park et al. |
| 2009/0250714 A1 | 10/2009 | Yun et al. |
| 2009/0273918 A1 | 11/2009 | Falicoff et al. |
| 2009/0284177 A1 | 11/2009 | Pedersen |
| 2009/0290380 A1 | 11/2009 | Meir et al. |
| 2009/0296018 A1 | 12/2009 | Harle et al. |
| 2009/0303412 A1 | 12/2009 | Ake et al. |
| 2009/0310338 A1 | 12/2009 | Negley |
| 2009/0315015 A1 | 12/2009 | Shimizu et al. |
| 2009/0322251 A1 | 12/2009 | Hilgers |
| 2010/0008628 A1 | 1/2010 | Shani |
| 2010/0014822 A1 | 1/2010 | Fine |
| 2010/0033420 A1 | 2/2010 | Jheng |
| 2010/0045189 A1 | 2/2010 | Storch et al. |
| 2010/0046219 A1 | 2/2010 | Pijlman et al. |
| 2010/0060157 A1 | 3/2010 | Shi |
| 2010/0079841 A1 | 4/2010 | Levola |
| 2010/0098377 A1 | 4/2010 | Meir |
| 2010/0195306 A1 | 8/2010 | Helbing et al. |
| 2010/0201611 A1 | 8/2010 | Duong et al. |
| 2010/0208469 A1 | 8/2010 | Shani |
| 2010/0208470 A1 | 8/2010 | Shani et al. |
| 2010/0220484 A1 | 9/2010 | Shani |

(56) References Cited

U.S. PATENT DOCUMENTS

| | | |
|---|---|---|
| 2010/0315817 A1 | 12/2010 | Zimmermann |
| 2010/0320904 A1 | 12/2010 | Meir |
| 2011/0013415 A1 | 1/2011 | Meir et al. |

FOREIGN PATENT DOCUMENTS

| | | |
|---|---|---|
| DE | 1 995 2430 | 5/2001 |
| EP | 0911658 | 10/1998 |
| EP | 0911658 | 4/1999 |
| EP | 1 676 708 A | 1/2004 |
| EP | 1521503 | 4/2005 |
| EP | 1776722 | 4/2007 |
| EP | 1876385 | 1/2008 |
| EP | 1901587 | 3/2008 |
| EP | 1988752 | 11/2008 |
| EP | 2018039 | 1/2009 |
| GB | 512062 | 8/1939 |
| GB | 2339318 | 1/2000 |
| GB | 2 343 351 | 5/2000 |
| GB | 2448564 | 10/2008 |
| JP | 5-127158 | 5/1993 |
| JP | 10-247412 | 9/1998 |
| JP | 2004-241282 | 8/2004 |
| JP | 2005-065718 | 3/2005 |
| WO | WO-96-23649 | 8/1996 |
| WO | WO-97-31219 | 8/1997 |
| WO | WO-99/12400 | 3/1999 |
| WO | WO-01/82657 | 11/2001 |
| WO | WO-02/095289 | 11/2002 |
| WO | WO-03-050448 | 6/2003 |
| WO | WO-03/065201 | 8/2003 |
| WO | WO-2004-017109 | 2/2004 |
| WO | WO-2004/034362 | 4/2004 |
| WO | WO-2004-053531 | 6/2004 |
| WO | WO-2004/100275 | 11/2004 |
| WO | WO-2005/096258 | 10/2005 |
| WO | WO-2005/101070 | 10/2005 |
| WO | WO-2006-131924 A | 12/2006 |
| WO | WO-2007/044472 | 4/2007 |
| WO | WO-2007/055509 | 5/2007 |
| WO | WO-2007/071397 | 6/2007 |
| WO | WO-2007/086657 | 8/2007 |
| WO | WO-2008/013097 | 1/2008 |
| WO | WO-2008/035282 | 3/2008 |
| WO | WO-2008/045311 | 4/2008 |
| WO | WO-2008/053063 | 5/2008 |
| WO | WO-2008/059445 | 5/2008 |
| WO | WO-2008/093267 | 8/2008 |
| WO | WO-2008/100277 | 8/2008 |
| WO | WO-2008-146290 A3 | 12/2008 |
| WO | WO-2008/148927 | 12/2008 |
| WO | WO-2009/130637 | 10/2009 |

OTHER PUBLICATIONS

Application Brief AB27 "For LCD Backlighting Luxeon DCC", Lumileds.
Beeson et al., "61.5: LED-Based Light-Recycling Light Sources for Projection Displays," *SID Symp. Dig. of Tech. Papers*, 37(1): 1823-1826 (2006).
Fine, "Back Light Modular Unit (BLMu) for large LCD screens", SIL 2006.
International Search Report and Written Opinion for PCT/IL 08/01553, mailed Mar. 25, 2009.
International Search Report and Written Opinion for PCT/IL2006/00066, dated Jun. 10, 2008.
International Search Report and Written Opinion for PCT/IL2006/000667, dated Jun. 10, 2008.
International Search Report and Written Opinion for PCT/IL2008/01554, dated May 19, 2009.
International Search Report for PCT/IL2003/01042, mailed Jul. 29, 2004.
International Search Report for PCT/IL2008/000730, mailed Nov. 25, 2008.
Jones-Bey, "High-Output LEDs: Solid-state lighting seeks a role in pictures," www.laserfocusworld.com/articles.
Smith-Gillespie, R., "LCD Backlighting Options and Design Considerations", SID Display Applications Tutorial, May 22, 2008.
Zwanenburg et al., "41 2: High Efficiency LEDs for LCD Backlights," *SID 04 Digest*, p. 1222, ISSN/0004-0966X/04/3502-1222.
Jones-Bey, "High-Output LEDs: Solid-State Lighting Seeks a Role in Pictures," www.laserfocusworld.com/articles (May 21, 2009).
Smith-Gillespie, R., "LCD Backlighting Options and Design Considerations", SID Display Applications Tutorial (May 22, 2008).
Zwanenburg et al., "41.2: High efficiency LEDs for LCD Backlights," *SID 04 Digest*, p. 1222, ISSN/0004-0966X/04/3502-1222 (2004).
"Solid-State Lighting Research and Development: Multi-year Program Plan," U.S. Department of Energy, 162 pages (Mar. 2010).
International Search Report and Written Opinion mailed Dec. 14, 2009 for International Application No. PCT/IL2009/000246 (25 pages).
Office Action in Israel Patent Application No. 169122, dated Dec. 22, 2008 (translation).
Tsao et al., "Solid-State Lighting: An Integrated Human Factors, Technology and Economic Perspective," Proc. IEEE, pp. 1-18 (Aug. 2009).
International Search Report and Written Opinion Oct. 11, 2011 for PCT/IB2010/058079 mailed (11 pages).

* cited by examiner

ILLUMINATION APPARATUS AND METHODS OF FORMING THE SAME

CROSS-REFERENCE TO RELATED APPLICATIONS

This application is a continuation of U.S. patent application Ser. No. 12/491,707, filed on Jun. 25, 2009, which (i) is a continuation-in-part of U.S. patent application Ser. No. 12/324,134, filed on Nov. 26, 2008, which is a continuation-in-part of U.S. patent application Ser. No. 11/921,305, filed on Nov. 30, 2007, which is the U.S. national stage application of International (PCT) Patent Application Serial No. PCT/IL2006/000667, filed Jun. 7, 2006, which claims the benefit of U.S. Provisional Patent Application No. 60/687,865, filed Jun. 7, 2005, and (ii) claims priority to and the benefit of U.S. Provisional Patent Application No. 61/076,427, filed on Jun. 27, 2008; U.S. Provisional Patent Application No. 61/135,098, filed on Jul. 16, 2008; U.S. Provisional Patent Application No. 61/217,576, filed on Jun. 2, 2009, and U.S. Provisional Patent Application 61/220,024, filed on Jun. 24, 2009. The entire disclosure of each of these applications is incorporated by reference herein.

TECHNICAL FIELD

In various embodiments, the present invention relates to artificial illumination, and in particular to an illumination apparatus capable of providing light at any intensity profile and any color profile, including, without limitation, uniform white light.

BACKGROUND

Artificial light may be generated in many ways, including, electroluminescent illumination (e.g., light-emitting diodes), incandescent illumination (e.g., conventional incandescent lamps and thermal light sources) and gas discharge illumination (e.g., fluorescent lamps, xenon lamps, and hollow cathode lamps). Light may also be emitted via direct chemical radiation discharge of a photoluminescent (e.g., chemoluminescence, fluorescence, or phosphorescence).

A light-emitting diode (LED) is essentially a p-n junction semiconductor diode that emits a monochromatic light when operated under forward bias. In the diode, current flows easily from the p-side to the n-side but not in the reverse direction. When two complementary charge carriers (i.e., an electron and a hole) collide, the electron-hole pair experiences a transition to a lower energy level and emits a photon. The wavelength of the light emitted depends on the difference between the two energy levels, which in turn depends on the band-gap energy of the materials forming the p-n junction.

LEDs are used in various applications, including, traffic signal lamps, large-sized full-color outdoor displays, various lamps for automobiles, solid-state lighting devices, flat panel displays, and the like. The basic structure of an LED consists of the light-emitting semiconductor material, also known as the bare die, and numerous additional components designed for improving the performance of the LED. These components may include a light-reflecting cup mounted below the bare die, a transparent encapsulation (typically silicone) surrounding and protecting the bare die and the light reflecting cup, and bonders for supplying the electrical current to the bare die. The bare die and the additional components are efficiently packed in a LED package.

The LED has won remarkable attention as a next-generation small-sized light-emitting source. The LED has heretofore had advantages such as a small size, high resistance and long life, but has mainly been used as indicator illumination for various measuring meters or a confirmation lamp in a control state because of restrictions on a light-emitting efficiency and light-emitting output. However, in recent years, the light-emitting efficiency has rapidly been improved, and may soon exceed that of a high-pressure mercury lamp or a fluorescent lamp of a discharge type. Due to the appearance of the high-efficiency high-luminance LED, a high-output light-emitting source using the LED has rapidly assumed a practicability. In recent years, a blue LED has been brought into practical use, complementing conventional red and green LEDs, and this has also accelerated the application of the LED.

The high-efficiency high-luminance LED has been considered as a promising small-sized light-emitting source of an illuminating unit having a light-condensing capability. The LED has characteristics superior to those of other light-emitting sources, such as life, durability, lighting speed, and lighting driving circuit. Furthermore, the availability of the three primary colors has enlarged an application range of a full-color image displays.

Luminescence is a phenomenon in which energy is absorbed by a substance, commonly called a luminescent, and emitted in the form of light. The absorbed energy may be in a form of light (i.e., photons), electrical field, or colliding particles (e.g., electrons). The wavelength of the emitted light differs from the characteristic wavelength of the absorbed energy (the characteristic wavelength equals hc/E, where h is the Plank's constant, c is the speed of light and E is the energy absorbed by the luminescent). Luminescence may be classified by excitation mechanism as well as by emission mechanism. Examples of such classifications include photoluminescence, electroluminescence, fluorescence, and phosphorescence. Similarly, luminescent materials may be classified into photoluminescent materials, electroluminescent materials, fluorescent materials, and phosphorescent materials, respectively.

A photoluminescent is a material which absorbs energy in the form of light, an electroluminescent is a material which absorbs energy is in the form of electrical field, a fluorescent material is a material which emits light upon return to the base state from a singlet excitation, and a phosphorescent material is a material which emits light upon return to the base state from a triplet excitation.

In fluorescent materials, or fluorophores, the electron de-excitation occurs almost spontaneously, and the emission ceases when the source which provides the exciting energy to the fluorophore is removed.

In phosphor materials, or phosphors, the excitation state involves a change of spin state which decays only slowly. In phosphorescence, light emitted by an atom or molecule persists after the exciting source is removed.

Luminescent materials are selected according to their absorption and emission characteristics and are widely used in cathode ray tubes, fluorescent lamps, X-ray screens, neutron detectors, particle scintillators, ultraviolet (UV) lamps, flat-panel displays, and the like. Luminescent materials, particularly phosphors, may also be used for altering the color of LEDs. Since blue light has a short wavelength (compared, e.g., to green or red light), and since the light emitted by the phosphor generally has a longer wavelength than the absorbed light, blue light generated by a blue LED may be readily converted to produce visible light having a longer wavelength. For example, a blue LED coated by a suitable yellow phosphor can emit white light. The phosphor absorbs the light from the blue LED and emits in a broad spectrum, with a peak in the yellow region. The photons emitted by the phosphor and the non-absorbed photons emitted of the LED are perceived together by the human eye as white light. The first commercially available phosphor based white LED was produced by Nichia Co. and consisted of a gallium indium nitride (InGaN) blue LED coated with a yellow phosphor.

In order to get sufficient brightness, a high-intensity LED is needed to excite the phosphor to emit the desired color. As commonly known, white light is composed of various colors of the whole range of visible electromagnetic spectrum. In the case of LEDs, only the appropriate mixture of complementary monochromatic colors can cast white light. This is typically achieved by having at least two complementary light sources in the proper power ratio. A "fuller" light (similar to sunlight) may be achieved by adding more colors. Phosphors are usually made of zinc sulfide or yttrium oxides doped with certain transition metals (Ag, Mn, Zn, etc.) or rare earth metals (Ce, Eu, Tb, etc.) to obtain the desired colors.

In a similar mechanism, white LEDs may also be manufactured using a fluorescent semiconductor material instead of a phosphor. The fluorescent semiconductor material serves as a secondary emitting layer, which absorbs the light created by the light-emitting semiconductor and reemits yellow light. The fluorescent semiconductor material, typically an aluminum gallium indium phosphide (AlGaInP), is bonded to the primary source wafer.

Another type of light-emitting device is an organic light emitting diode (OLED) which makes use of thin organic films. An OLED device typically includes an anode layer, a cathode layer, and an organic light-emitting layer containing an organic compound that provides luminescence when an electric field is applied. OLED devices are generally (but not always) intended to emit light through at least one of the electrodes, and may thus include one or more transparent electrodes.

Combinations of LEDs, OLEDs, and luminescence are widely used in the field of electronic display devices. Many efforts have been made to research and develop various types of such devices. Electronic display devices may be categorized into active-display devices and passive-display devices. The active-display devices include the cathode ray tube (CRT), the plasma display panel (PDP), and the electroluminescent display (ELD). The passive-display devices include a liquid crystal display (LCD), the electrochemical display (ECD), and the electrophoretic image display (EPID).

In active-display devices, each pixel radiates light independently. Passive-display devices, on the other hand, do not produce light within the pixel and the pixel is only able to block light. In LCD devices, for example, an electric field is applied to liquid-crystal molecules, and an alignment of the liquid-crystal molecule is changed depending on the electric field, to thereby change optical properties of the liquid crystal, such as double refraction, optical rotatory power, dichroism, light scattering, etc. Since LCDs are passive, they display images by reflecting external light transmitted through an LCD panel or by using the light emitted from a light source, e.g., a backlight assembly, disposed below the LCD panel.

An LCD includes a LCD panel and backlight assembly. The LCD panel includes an arrangement of pixels, which are typically formed of thin-film transistors fabricated on a transparent substrate coated by a liquid-crystal film. The pixels include three color filters, each of which transmits one-third of the light produced by each pixel. Thus, each LCD pixel is composed of three sub-pixels. The thin-film transistors are addressed by gate lines to perform display operation by way of the signals applied thereto through display signal lines. The signals charge the liquid-crystal film in the vicinity of the respective thin-film transistors to effect a local change in optical properties of the liquid crystal film.

A typical LED backlight assembly includes a source of white light, a light-guiding plate for guiding the light toward the LCD panel, a reflector disposed under the light-guiding plate to reflect the light leaked from the light-guiding plate back toward the light-guiding plate, and optical sheets for enhancing brightness of the light exiting from the light-guiding plate. Backlight assemblies are designed to achieve many goals, including high brightness, large-area coverage, uniform luminance throughout the illuminated area, controlled viewing angle, small thickness, low weight, low power consumption, and low cost.

In operation, a backlight assembly produces white illumination directed toward the LCD pixels. The optical properties of the liquid-crystal film are locally modulated by the thin-film transistors to create a light-intensity modulation across the area of the display. The color filters colorize the intensity-modulated light emitted by the pixels to produce a color output. By selective opacity modulation of neighboring pixels of the three-color components, selected intensities of the three component colors are blended together to selectively control color light output. Selective blending of three primary colors, i.e., red, green, and blue (RGB), generally produces a full range of colors suitable for color display purposes.

LCD devices are currently employed in many applications (cellular phones, personal acceptance devices, desktop monitors, portable computers, television displays, etc.), and there is a growing need to devise high-quality backlight assemblies for improving the image quality in these applications.

Since the light from the backlight must pass through the color filters, it therefore must include a wavelength at which the respective filter is transparent. However, the use of white LEDs composed of blue LEDs coated by yellow phosphors is not efficient for backlighting because, although such dichromatic light appears as white light to the human eye, it cannot efficiently pass through RGB color filters. Another potential approach is the use of red, green, and blue LEDs that match the central wavelength of each color filter. This approach significantly complicates the manufacturing process because the red, green, and blue LEDs must be accurately aligned in a multichip approach. An additional approach is to generate white light using a UV LED and three different phosphors, each emitting light at a different wavelength (e.g., red, green and blue). The efficiency of this configuration, however, is very low because a high amount of heat is released due to the Stokes shift. Other configurations include, two LEDs and a phosphor (e.g., a blue LED a red LED, and a green phosphor), three LEDs and a phosphor (e.g., a blue LED, a red LED, a cyan LED, and a green phosphor), two LEDs and two phosphors (e.g., a blue LED, a red LED, a cyan phosphor, and a green phosphor), and the like. Although these configurations show improvement in performance, the results are far from optimal.

Presently known LED-based backlight devices are limited by the size, price and performance of the LEDs. To date, the performance of the LED is controlled by its transparent encapsulation (which provides the necessary light scattering), the phosphor or fluorescent semiconductor material which is responsible for color conversion, and the lead frame which allows for heat evacuation, all of which significantly increase the size and cost of the LED. Since the performance, cost, and size of the LED are conflicting features, some compromises are inevitable.

There is thus a widely recognized need for, and it would be highly advantageous to have, a diode-based illumination apparatus devoid of the above limitations.

SUMMARY

The background art does not teach or suggest an illumination apparatus capable of generating light while, at the same time, propagating, diffusing and emitting the light through its surface area or a portion thereof. The background art also does not teach or suggest such an illumination apparatus having superior optical and/or geometrical properties, including, without limitation, a thickness of a few centimeters or less, and high light quality in terms of brightness, intensity, and/or color profiles. The background art also does not teach such an illumination apparatus that is useful for a variety of different applications, e.g., passive displays, which can benefit from its superior properties.

Generally, embodiments of the present invention overcome the deficiencies of the background art by providing an illumination apparatus that generates and diffuses light. The illumination apparatus comprises one or more light-emitting sources embedded in a waveguide material. The waveguide material is capable of propagating light generated by the light-emitting source(s), such that at least a portion of the light is diffused within the waveguide material and exits through at least a portion of its surface. In various exemplary embodiments of the invention the light-emitting source(s) include or consist essentially of bare LED dies.

Embodiments of the present invention may be incorporated in a passive display device or serve for providing signage or for providing illumination in various decorative patterns of significant aesthetic interest. In various exemplary embodiments of the invention, the apparatus serves as a component of an LCD device.

In one aspect, embodiments of the invention feature an illumination apparatus including a waveguide having a first surface. Embedded within the waveguide is a light-emitting source for emitting source light and a photoluminescent material for converting some of the source light to a different wavelength. The converted source light mixes with unconverted source light to form output light spectrally different from both the converted source light and the unconverted source light. Output light is emitted from at least a portion of the first surface. The photoluminescent material includes or consists essentially of nano-size phosphor particles and/or quantum dots.

One or more of the following features may be included. The photoluminescent material may include a first layer and, proximate and/or in direct contact with the first layer, a second layer. The first layer may include or consist essentially of nano-size phosphor particles and/or quantum dots, and the second layer may include or consist essentially of a phosphor material. The second layer may not contain nano-size phosphor particles or quantum dots, and may scatter source light. The source light may include at least one of blue light or ultraviolet light, or substantially white light. The light-emitting source may include a bare LED die and may be embedded proximate a second surface of the waveguide opposite the first surface. A printed circuit board may be proximate the second surface of the waveguide, and the light-emitting source may be electrically connected to the printed circuit board. The photoluminescent material may be disposed proximate the first surface or may be dispersed throughout substantially all of the waveguide. The photoluminescent material may scatter source light. An encapsulation may be disposed between the light-emitting source and the waveguide. The photoluminescent material may be disposed proximate and in direct contact with the encapsulation. The waveguide may be substantially planar.

The waveguide may further include a discrete in-coupling region for receiving source light, a discrete out-coupling region for emitting output light, and a discrete propagation region, spatially distinct from the in-coupling and out-coupling regions, for propagating source light from the in-coupling region to the out-coupling region. The in-coupling region may include a first plurality of scattering impurities, the out-coupling region may include a second plurality of scattering impurities, and the propagation region may be substantially free of scattering impurities. The concentration, size, and/or type of the second plurality of scattering particles may vary along at least one dimension of the out-coupling region or may increase as a function of distance from the in-coupling region. The propagation region may include the photoluminescent material, and the photoluminescent material may be disposed proximate and in direct contact with the first surface in the out-coupling region. The photoluminescent material may include or consist essentially of nano-size phosphor particles having an average diameter of less than approximately 3 nm.

In another aspect, embodiments of the invention feature an illumination apparatus including a waveguide having a first surface. Embedded within the waveguide is a light-emitting source for emitting source light. A layer of phosphor-encapsulating material is disposed on the first surface of the waveguide. The layer of phosphor-encapsulating material includes a photoluminescent material for converting some of the source light to a different wavelength. The converted source light mixes with unconverted source light to form output light spectrally different from both the converted source light and the unconverted source light. Source light is emitted from at least a portion of the first surface of the waveguide, and output light is emitted from at least a portion of the layer of phosphor-encapsulating material.

One or more of the following features may be included. The layer of phosphor-encapsulating material may include or consist essentially of silicone, and may be in mechanical contact but not optical contact with the first surface of the waveguide. The index of refraction of the phosphor-encapsulating material may be less than the index of refraction of the waveguide.

The waveguide may further include a discrete in-coupling region for receiving source light, a discrete out-coupling region for emitting output light, and a discrete propagation region, spatially distinct from the in-coupling and out-coupling regions, for propagating source light from the in-coupling region to the out-coupling region. The in-coupling region may include a first plurality of scattering impurities, the out-coupling region may include a second plurality of scattering impurities, and the propagation region may be substantially free of scattering impurities. The concentration, size, and/or type of the second plurality of scattering particles may vary along at least one dimension of the out-coupling region or may increase as a function of distance from the in-coupling region. The photoluminescent material may be present at least, or even only, over the out-coupling region.

The layer of phosphor-encapsulating material may have a thickness less than approximately 200 µm. The photoluminescent material may include or consist essentially of a plurality of particles having an average diameter ranging from approximately 0.5 µm to approximately 50 µm. The photoluminescent material may include or consist essentially of nano-size phosphor particles and/or quantum dots.

In yet another aspect, embodiments of the invention feature an illumination apparatus including a waveguide having a first surface. Multiple light-emitting sources, each emitting a different source light, are embedded within the waveguide. Disposed proximate the first surface is a photoluminescent material for converting some of the source light of one or more of the light-emitting sources to a different wavelength. The converted source light mixes with unconverted source light to form output light spectrally different from both the converted source light and the unconverted source light. The output light is emitted from at least a portion of the first surface and has a CRI value greater than approximately 70. The CRI value of the output light may be greater than approximately 80.

One or more of the following features may be included. The different source lights may include or consist essentially of red, green, and blue light. The converted source light may include or consist essentially of yellow light. The output light may be substantially white light. The photoluminescent material may be disposed within the waveguide, or may be disposed within a layer of phosphor-encapsulating material disposed above and in mechanical contact with the first surface. The layer of phosphor-encapsulating material may or may not be disposed in optical contact with the first surface. The photoluminescent material may include or consist essentially of nano-size phosphor particles and/or quantum dots.

In a further aspect, embodiments of the invention feature a plurality of illumination apparatuses. The first illumination apparatus includes a first light-emitting source emitting source light having a first wavelength, and a first layer including or consisting essentially of a photoluminescent material. The photoluminescent material converts some of the source light to a different wavelength. The converted source light mixes with unconverted source light to form output light spectrally different from both the converted source light and the unconverted source light. The second illumination apparatus includes a second light-emitting source emitting source light having a second wavelength, as well as a second layer including or consisting essentially of the photoluminescent material. The second wavelength may differ from the first wavelength by at least approximately 2 nm, at least approximately 5 nm, or at least approximately 10 nm. The color coordinates of the first and second illumination apparatuses differ by no more than approximately 5%, or even by no more than approximately 1%.

In another aspect, embodiments of the invention feature a method of forming an illumination apparatus. The method includes embedding a light-emitting source within a waveguide and embedding a photoluminescent material within the waveguide. The photoluminescent material includes or consists essentially of nano-size phosphor particles and/or quantum dots.

One or more of the following features may be included. The light-emitting source may include a bare LED die. The waveguide may include a discrete in-coupling region for receiving source light, a discrete out-coupling region for emitting output light, and a discrete propagation region, spatially distinct from the in-coupling and out-coupling regions, for propagating source light from the in-coupling region to the out-coupling region. The photoluminescent material may include or consist essentially of nano-size phosphor particles having an average diameter of less than approximately 3 nm.

In another aspect, embodiments of the invention feature a method of forming an illumination apparatus. The method includes embedding a light-emitting source within a waveguide and disposing a layer above the first surface of the waveguide. The layer may include a photoluminescent material, and may be in mechanical contact with the waveguide. The layer may not be in optical contact with the waveguide. The photoluminescent material may include or consist essentially of nano-size phosphor particles and/or quantum dots.

The waveguide may further include a discrete in-coupling region for receiving source light, a discrete out-coupling region for emitting output light, and a discrete propagation region, spatially distinct from the in-coupling and out-coupling regions, for propagating source light from the in-coupling region to the out-coupling region. The in-coupling region may include a first plurality of scattering impurities, the out-coupling region may include a second plurality of scattering impurities, and the propagation region may be substantially free of scattering impurities. The concentration, size, and/or type of the second plurality of scattering particles may vary along at least one dimension of the out-coupling region or may increase as a function of distance from the in-coupling region. The photoluminescent material may be present at least, or even only, over the out-coupling region.

In another aspect, embodiments of the invention feature a method of producing output light. The method includes providing a waveguide, including a first surface, having embedded therein a light-emitting source and a photoluminescent material and emitting source light from the light-emitting source. A portion of the source light is converted to a different wavelength and mixed with unconverted source light to form output light spectrally different from both the converted source light and the unconverted source light. Output light is emitted from at least a portion of the first surface. The photoluminescent material includes or consists essentially of nano-size phosphor particles and/or quantum dots.

One or more of the following features may be included. The light-emitting source may include a bare LED die. The waveguide may include a discrete in-coupling region for receiving source light from the light-emitting source, a discrete propagation region for propagating source light, and a discrete out-coupling region for emitting output light. The light-emitting source may be operated utilizing pulsed electrical current.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
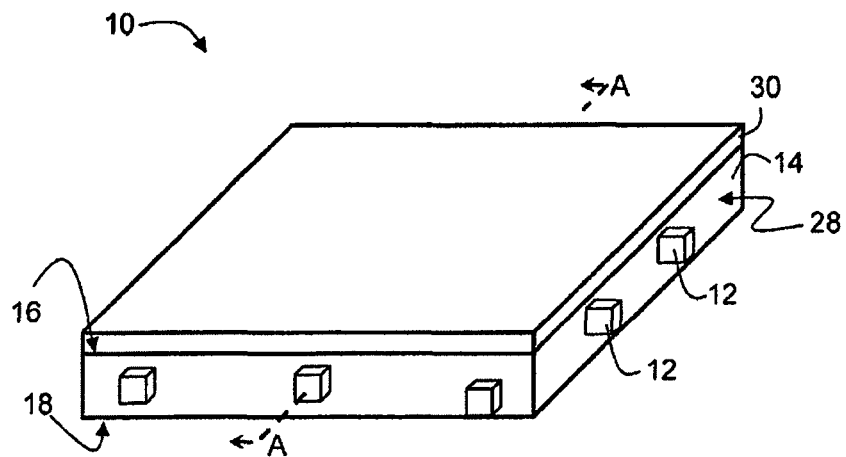
FIGS. 1a-1b are a perspective view (FIG. 1a) and a section view (FIG. 1b) of an illumination apparatus, according to various exemplary embodiments of the present invention.

Embodiments of the present invention include an apparatus, device and system that may be used for providing illumination or displaying images. Specifically, embodiments of the present invention may be used to provide light at any intensity profile and any color profile. The present embodiments are useful in many areas in which illumination is required, including, without limitation, display, signage and decoration applications.

When a ray of light moves within a transparent substrate and strikes one of its internal surfaces at a certain angle, the ray of light may be either reflected from the surface or refracted out of the surface into the open air in contact with the substrate. The condition according to which the light is reflected or refracted is determined by Snell's law, which is a mathematical relation between the impinging angle, the refracting angle (in case in case of refraction), and the refractive indices of both the substrate and the air. Broadly speaking, depending on the wavelength of the light, for a sufficiently large impinging angle (also known as the critical angle) no refraction can occur and the energy of the light is trapped within the substrate. In other words, the light is reflected from the internal surface as if from a mirror. Under these conditions, total internal reflection is said to take place.

Many optical systems operate according to the total-internal-reflection phenomenon. One such optical system is the optical fiber. Optical fibers are transparent flexible rods of glass or plastic, basically composed of a core and cladding. The core is the inner part of the fiber, through which light is guided, while the cladding surrounds it completely. The refractive index of the core is higher than that of the cladding, so that light in the core impinging the boundary with the cladding at a critical angle is confined in the core by total internal reflection.

As stated, total internal reflection occurs only for light rays impinging the internal surface of the optical fiber with an angle which is larger than the critical angle. Thus, a calculation performed according to geometrical optics may provide the largest angle that is allowed for total internal reflection to take place. An important parameter of every optical fiber (or any other light-transmitting optical system) is known as the "numerical aperture," which is defined as the sine of the largest incident light ray angle that is successfully transmitted through the optical fiber, multiplied by the index of refraction of the medium from which the light ray enters the optical fiber.

Another optical system designed for guiding light is the graded-index optical fiber, in which a light ray is guided by refraction rather than by total internal reflection. In this optical fiber, the refractive index decreases gradually from the center outwards along the radial direction, and finally drops to the same value as the cladding at the edge of the core. As the refractive index does not change abruptly at the boundary between the core and the cladding, there is no total internal reflection. However, although no total internal reflection takes place, refraction bends the guided light rays back into the center of the core while the light passes through layers with lower refractive indexes.

Optical fibers are available in various lengths and core diameters. For large core diameters, glass optical fibers are known to be more brittle and fragile than plastic optical fiber.

Another type of optical system is based on photonic materials, where the light ray is confined within a band-gap material surrounding the light ray. In this type of optical system, also known as a photonic-material waveguide, the light is confined in the vicinity of a low-index region. One example of a photonic-material waveguide is a silica fiber having an array of small air holes throughout its length. This configuration is capable of providing lossless light transmission, e.g., in either cylindrical or planar type waveguides.

The above description holds both for polarized and unpolarized light. When polarized light is used, an additional electromagnetic phenomenon influences the reflection of the light, as further explained hereinbelow.

Polarized light is produced when the direction of the electromagnetic fields in the plane perpendicular to the direction of propagation are constrained in some fashion. For the purpose of providing a simple explanation, only the electric field is discussed herein. A complementary explanation, regarding the magnetic field, can be easily obtained by one ordinarily skilled in the art by considering the magnetic field as being perpendicular to both the direction of propagation and the electric field.

The light is said to be elliptically polarized when two perpendicular components of the electric field have a constant phase difference, and the tip of the electric field vector traces out an ellipse in the plane perpendicular to the direction of propagation. Linearly polarized light is a special case of elliptically polarized light, where the two components oscillate in phase and the electric vector traces out a straight line.

Circularly polarized light is also a special case of elliptically polarized light in which the two components have a 90° phase difference and the electric-field vector traces out a circle in the plane perpendicular to the direction of propagation. When viewed looking towards the source, a right circularly polarized beam at a fixed position as a function of time has a field vector that describes a clockwise circle, while left circularly polarized light has a field vector that describes a counter-clockwise circle.

When polarized light strikes a surface between two different materials, it is useful to define the polarization of the light relative to the surface, typically as horizontal and vertical polarizations with respect to the surface. When the light strikes a material having associated values of permeability, permittivity, and conductivity, a portion of the energy carried by the light is lost due to the non-ideal conductivity of the material. The relative portion of the energy which is lost is defined as the reflection coefficient of the material. The reflective coefficient varies according to the angle of incidence, the polarization of the incoming wave, its frequency and the characteristics of the surface. For horizontal polarizations the coefficient may be generalized to a constant value, whereas for vertical polarizations, however, the coefficient varies between 0 and 1.

When the reflective coefficient value goes to zero, the light is not reflected from the surface. This phenomenon is known as the Brewster effect, and the angle at which there is not reflection (for a particular polarization) is called the Brewster angle. This angle often referred to as the polarizing angle, since an unpolarized wave incident on an interface at this angle is reflected as a polarized wave with its electric vector being perpendicular to the plane of incidence.

Embodiments of the present invention successfully provide various illumination apparatuses which provide surface illumination at any brightness, intensity, and color profile. As further detailed herein, an additional physical phenomenon, light scattering, may be exploited by the illumination apparatus of the present embodiments.

Unlike the abovementioned reflection, where radiation is deflected from the surface in one direction, some particles and molecules, also known as scatterers, have the ability to scatter radiation in more than one direction. Many types of scatterers are known. Broadly speaking, scatterers may be categorized into two groups: (i) selective scatterers, which are more effective at scattering a particular wavelength (i.e., color), or a narrow range of wavelengths, of the light; and (ii) non-selective scatterers, which are capable of scattering light in a wide range of wavelengths.

Figure 1B:
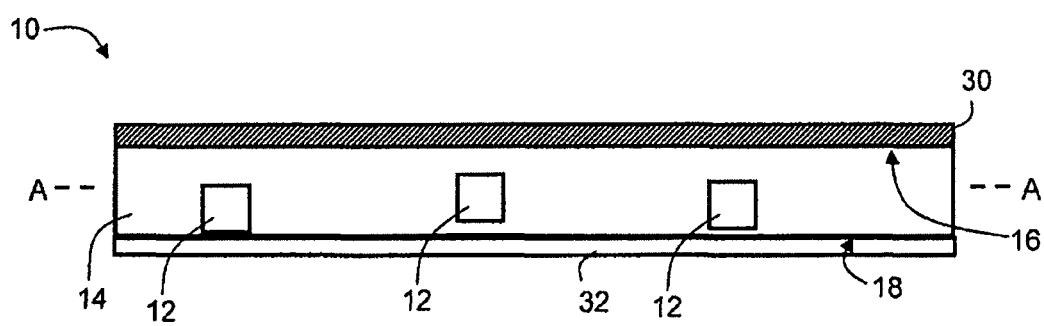

Referring now to the drawings, FIGS. 1a-1b illustrate a perspective view (FIG. 1a) and a section view along line A-A (FIG. 1b) of an illumination apparatus 10, according to various exemplary embodiments of the present invention.

Apparatus 10 comprises one or more light-emitting sources 12 embedded in a waveguide material 14 having a first surface 16 and a second surface 18. Waveguide material 14 is capable of propagating light generated by each light source 12, such that at least a portion of the light is diffused within waveguide material 14 and exits through at least a portion of first surface 16 (and/or, in some embodiments, second surface 18).

The terms "light source" and "light-emitting source," are used herein interchangeably and refer to any self light-emitting element, including, without limitation, an inorganic light-emitting diode, an organic light-emitting diode, and/or any other electroluminescent element. The term "light source" as used herein refers to one or more light sources.

As used herein, the term "organic" includes polymeric materials as well as small-molecule organic materials that may be used to fabricate organic optoelectronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small-molecule emitter. A dendrimer may be a "small molecule," and it is believed that all dendrimers currently used in the field of OLEDs are small molecules.

Organic light emitting diodes suitable for application in embodiments of the present invention may be bottom-emitting OLEDs, top-emitting OLEDs and side-emitting OLEDs having one or more transparent electrodes.

As used herein, "top" refers to furthest away from second surface 18, while "bottom" refers to closest to second surface 18.

The waveguide material according to embodiments of the present invention may be similar to, and/or be based on, the teachings of U.S. patent application Ser. Nos. 11/157,190, 60/580,705 and 60/687,865, all assigned to the common assignee of the present invention and fully incorporated herein by reference. Alternatively, the waveguide material according to some embodiments of the present invention may also have other configurations and/or other methods of operation as further detailed herein.

Waveguide material 14 may be translucent or clear as desired. In any event, since waveguide material 14 propagates and emits the light emitted by light source 12, it is transparent at least to the characteristic emission spectrum of light source 12. The characteristic emission spectrum of the light source is also referred to herein as the "color" of the light source. Thus, for example, a light-emitting source characterized by a spectrum having an apex at a wavelength of from about 420 to about 500 nm is referred to as a "blue light source," a light-emitting source characterized by a spectrum having an apex at a wavelength of from about 520 to about 580 nm is referred to as a "green light source," a light-emitting source characterized by a spectrum having an apex at a wavelength of about 620 to about 680 nm is referred to as a "red light source," and so on for other colors. This terminology is well-known to those skilled in the art of optics.

As used herein the terms "about" or "approximately" refer to ±10% unless otherwise indicated.

Figure 1C:
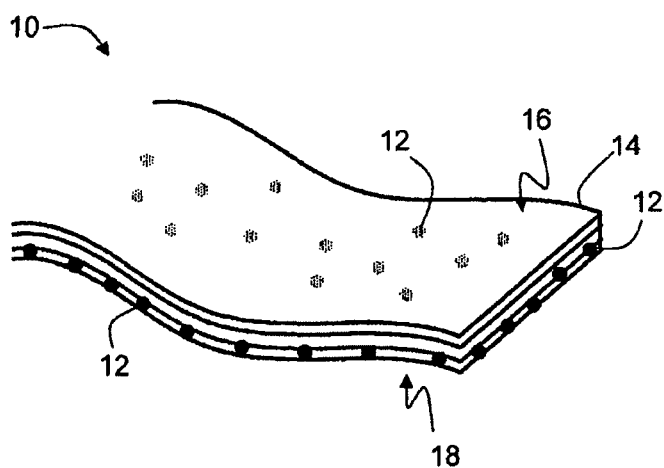
FIG. 1c is a perspective view of the apparatus in a preferred embodiment in which the apparatus includes or consists essentially of a non-planar waveguide material.

Waveguide material 14 is optionally and preferably flexible, and may also have a certain degree of elasticity. Thus, material 14 may include or consist essentially of, for example, an elastomer. It is to be understood that although waveguide material 14 appears to be flat, i.e., is substantially planar, in FIGS. 1a-1b, this need not necessarily be the case. FIG. 1c schematically illustrates a perspective view of apparatus 10 in a preferred embodiment in which waveguide material 14 is non-planar. Further, although apparatus 10 is shown as opaque from one direction, this is only for clarity of presentation and need not necessarily be the case; the surfaces of apparatus 10 are not necessarily opaque. Waveguide material 14 is generally solid (i.e., not hollow).

According to a preferred embodiment of the present invention, apparatus 10 comprises a reflecting surface 32 that prevents emission of light through surface 18 and therefore enhances emission of light through surface 16. Surface 32 may include or consist essentially of any light-reflecting material, and may be either embedded in or attached to waveguide material 14. Apparatus 10 may further include a printed circuit board (not shown, see reference numeral 26 in FIG. 2b), which supplies forward bias to the embedded light source.

There are several advantages for embedding the light source within the waveguide material. One advantage is that all of the light emitted from the light source eventually arrives at the waveguide material. When the light source is externally coupled to the waveguide material, some of the light scatters at wide angles and does not impinge on the waveguide material. Thus, the embedding of light source 12 in waveguide material 14 allows the efficient collection of the emitted light.

Another advantage is the optical coupling between the light source and the waveguide material, in particular when the light source is a light-emitting diode. When a diode is externally coupled to the waveguide material, the light emitted from the p-n junction should be transmitted out of the diode into the air, and subsequently from the air into the waveguide material. The mismatch of impedances in each such transition significantly reduces the coupling efficiency due to unavoidable reflections when the light passes from one medium to the other. On the other hand, when the diode is embedded in waveguide material, there is a direct transition of light from the diode to the waveguide material with a higher overall transmission coefficient. To further improve the coupling efficiency, the waveguide material is preferably selected with a refraction index which is close to the refraction index of the diode. Typical difference in refraction indices is from about 1.5 to about 1.6.

Light source 12 may include or consist essentially of an LED, which includes the bare die and all the additional components packed in the LED package, or, more preferably, light source 12 may include or consist essentially of the bare die, excluding one or more of the other components (e.g., reflecting cup, silicon, LED package, and the like). In preferred embodiments of the invention, bare LED dies do not include a phosphor or other photoluminescent material as a portion thereof (e.g., on a common substrate therewith or incorporated into or onto the LED semiconductor layer structure).

As used herein "bare die" refers to a p-n junction of a semiconductor material. When a forward bias is applied to the p-n junction through electrical contacts connected to the p side and the n side of the p-n junction, the p-n junction emits light with a characteristic spectrum.

Thus, in various exemplary embodiments of the invention, light source 12 includes or consists essentially of only the semiconductor p-n junction and the electrical contacts. Also contemplated are configurations in which several light sources are LEDs, and several light sources are bare dies with electrical contacts connected thereto.

The advantage of using a bare die rather than an LED is that some of the components in the LED package, including the LED package itself, absorb part of the light emitted from the p-n junction and therefore reduce the light yield.

Another advantage is that the use of a bare die reduces the amount of heat generated during light emission. This is because heat is generated due to absorption of light by the LED package and reflecting cup. The consequent increase in temperature of the p-n junction causes a thermal imbalance that is known to reduce the light yield. Since the bare die does not include the LED package and reflecting cup, the embedding of a bare die in the waveguide material reduces the overall amount of heat and increases the light yield. The elimination of the LED package permits the use of many small bare dies instead of large packaged LEDs. Such a configuration allows the operation of each bare die at low power while still producing a sufficient overall amount of light, thus improving the p-n junction efficacy.

An additional advantage is light diffusion within the waveguide material. The minimization of redundant components in the vicinity of the p-n junction results in almost isotropic emission of light from the p-n junction that improves the diffusion of light. To further improve the coupling efficiency, the waveguide material is preferably selected with a refraction index which is close to the refraction index of the p-n junction.

Figure 2A:
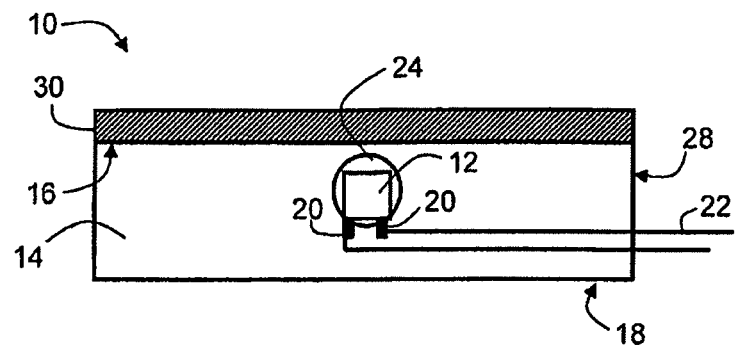
FIGS. 2a-2f are schematic fragmentary views of preferred embodiments in which a source or sources are embedded in the bulk of the waveguide material (FIGS. 2a and 2c) or near the surface of the waveguide material (FIGS. 2b, 2d-2f)
Figure 2B:
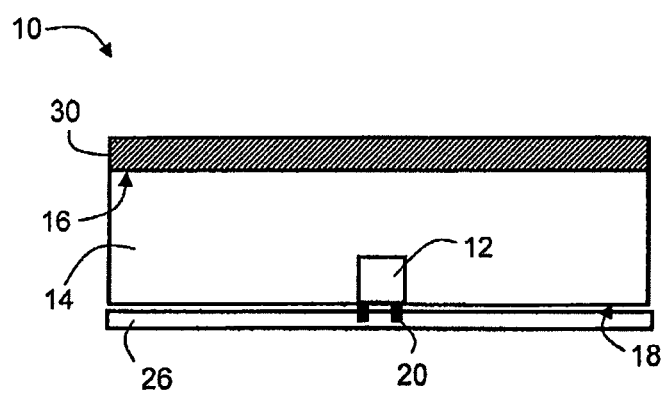

Light source 12 may be, e.g., embedded in the bulk of waveguide material 14 or near surface 18. FIG. 2a is a fragmentary view schematically illustrating an embodiment in which light source 12 is embedded in the bulk of material 14, and FIG. 2b is fragmentary view schematically illustrating an embodiment in which light source 12 is embedded near surface 18. It is to be understood that FIGS. 2a-2b illustrate a single light source 12 for clarity of presentation and are not intended to limit the scope of the present invention to such a configuration. As stated, apparatus 10 may include one or more light-emitting sources.

Referring to FIG. 2a, when light source 12 is embedded in the bulk of the waveguide material, the electrical contacts 20 may remain within material 14. In this embodiment, the forward bias may be supplied to light source 12 by electrical lines 22, such as flexible conductive wires, which are also embedded in material 14. Thus, lines 22 extend from contacts 20 to one or more ends 28 of waveguide material 14. Light source 12 including the electrical lines 22 may be embedded in material 14 during the manufacturing process of the waveguide material. When a plurality of light sources are embedded in the waveguide material, they may be connected to an arrangement of electrical lines as known in the art and the entirety of light sources and arrangement of electrical lines may be embedded in the material during the manufacturing process of the waveguide material.

In various exemplary embodiments of the invention, light source 12 is operated with low power and therefore does not produce large amount of heat. This is due to the relatively large light yield of the embedded light source and the high optical coupling efficiency between the light source and the waveguide material. In particular, when light source 12 is a bare die, its light yield is significantly high while the produced heat is relatively low. Light source 12 may also be operated using pulsed electrical current which further reduces the amount of produced heat.

Preferably, but not obligatorily, light source 12 is encapsulated by a transparent thermal isolating encapsulation 24. Encapsulation 24 serves for thermally isolating the light source from material 14. This embodiment is particularly useful when light source 12 is a bare die, in which case the bare die radiates heat that may change the optical properties of material 14. Alternatively or additionally, waveguide material 14 may have high specific heat capacity to allow material 14 to receive heat from light source 12 with minimal or no undesired heating effects.

Referring to FIG. 2b, when light source 12 is embedded near surface 18 of material 14, electrical contacts 20 may remain outside material 14 at surface 18 and may therefore be accessed without embedding electrical lines in material 14. The electrical contacts may be applied with forward bias using external electrical lines or directly from a printed circuit board 26. In this embodiment, board 26 may be made, at least in part, of heat-conducting material so as to facilitate evacuation of heat away from light source 12. When the heat evacuation by board 26 is sufficient, light source 12 may be embedded without thermal isolating encapsulation 24.

As stated, waveguide material 14 is capable of propagating and diffusing the light until it exits though surface 16 or a portion thereof. It will be appreciated that this ability of the waveguide material, combined with the high light yield and efficient optical coupling between the embedded light sources and the waveguide material, provides apparatus 10 with properties suitable for many applications.

As is further detailed herein, there are many alternatives for construction of the waveguide material that provide flexibility in its design. In particular, the waveguide material may be tailored according to the desired optical properties of the waveguide. Thus, the distribution of light sources within the waveguide material and/or the optical properties of the waveguide material may be selected to provide the most suitable illumination for the specific application for which apparatus 10 is used. More specifically, apparatus 10 may provide illumination at a predetermined light profile, which is manifested by a predetermined intensity profile, predetermined brightness profile, and/or predetermined color profile. Such an illumination apparatus may therefore provide high light quality in terms of brightness, intensity, and/or color profiles.

For example, light sources emitting different colors of light (i.e., light sources having different characteristic emission spectra, which may or may not have spectral overlaps therebetween), for example two, three, or more different colors, may be distributed in the waveguide such that surface 16 emits light at a predetermined light profile. Additionally, the optical properties of the waveguide material may be made local and wavelength-dependent according to the predetermined light profile. More specifically, according to the presently preferred embodiment of the invention, different regions in the waveguide material have a different response to different light spectra.

In various exemplary embodiments of the invention, apparatus 10 includes one or more photoluminescent materials 30 coating surface 16 or a portion thereof. Photoluminescent material 30 may include or consist essentially of, e.g., a phosphor or a fluorophore. In a preferred embodiment, photoluminescent material 30 is disposed or dispersed within a phosphor-encapsulating material having an index of refraction less than the index of refraction of waveguide material 14. For example, waveguide material 14 may include or consist essentially of polymethylmethacrylate (PMMA) having an index of refraction of approximately 1.5, and photoluminescent material 30 may be disposed within a phosphor-encapsulating material including or consisting essentially of silicone having an index of refraction of approximately 1.4. The phosphor-encapsulating material may be present as a discrete layer, "foil," or "module" disposed on apparatus 10 (e.g., on surface 16, as shown in FIGS. 2a and 2b), or may be disposed within apparatus 10. In various embodiments, the phosphor-encapsulating material is disposed over but not in optical contact with apparatus 10 (e.g., with surface 16). The phosphor-encapsulating material may be disposed in mechanical contact with apparatus 10, but, e.g., an optical adhesive may not be utilized, thereby leaving an air gap (having a thickness on the micrometer scale) therebetween. The air gap facilitates light entering the phosphor-encapsulating material having been out-coupled from apparatus 10 (e.g., as described below) by design rather than due to any index of refraction difference between the phosphor-encapsulating material and waveguide material 14.

In other embodiments, photoluminescent material 30 is disposed neither on surface 16 nor directly on light source 12. Rather, as described further below, the photoluminescent material (e.g., in the form of particles and/or layer(s)) is disposed within apparatus 10 some distance away from light source 12 (including, e.g., disposed proximate and/or in direct contact with an encapsulant around light source 12).

The term "photoluminescent material" is commonly used herein to describe one or a plurality of photoluminescent materials (which exhibit, for example, chemoluminescence, fluorescence, and/or phosphorescence), e.g., in layered or mixed form. Additionally, a photoluminescent material may comprise one or more types of photoluminescent molecules. In any event, a photoluminescent material is characterized by an absorption spectrum (i.e., a range of wavelengths of light which may be absorbed by the photoluminescent molecules to effect quantum transition to a higher energy level) and an emission spectrum (i.e., a range of wavelengths of light which are emitted by the photoluminescent molecules as a result of quantum transition to a lower energy level). The emission spectrum of the photoluminescent layer is typically wider and shifted relative to its absorption spectrum. The difference in wavelength between the apex of the absorption and emission spectra of the photoluminescent material is referred to as the Stokes shift of the photoluminescent material.

The absorption spectrum of photoluminescent material 30 preferably overlaps the emission spectrum of at least one of light sources 12. More preferably, for each characteristic emission spectrum of an embedded light source, there is at least one photoluminescent material having an absorption spectrum overlapping the emission spectrum the light source. According to a preferred embodiment of the present invention, the apex of the light source's emission spectrum lies in the spectrum of the photoluminescent material, and/or the apex of the photoluminescent material's absorption spectrum lies in the spectrum of the light source.

Photoluminescent material 30 serves to "convert" the wavelength of a portion of the light emitted by light sources 12. More specifically, for each photon that is successfully absorbed by material 30, a new photon is emitted. Depending on the type of photoluminescent material, the emitted photon may have a wavelength which is longer or shorter than the wavelength of the absorbed photon. Photons that do not interact with material 30 may propagate therethrough. The combination of converted light and non-converted light preferably forms the light profile of apparatus 10.

Phosphors are widely used for coating individual LEDs, typically in the white LED industry. However, photoluminescent materials covering an illuminating surface of a waveguide material such as the waveguide material of the present embodiments have not been employed. An advantage of using material 30 over waveguide material 14, as opposed to on each individual light-emitting source 12, is that waveguide material 14 first diffuses the light and thereafter emits it through surface 16. Thus, instead of collecting light from a point light source (e.g., an LED), material 30 collects light from a surface light source having a predetermined area (surface 16 or a portion thereof). This configuration allows better control of the light profile provided by apparatus 10.

Figure 2C:
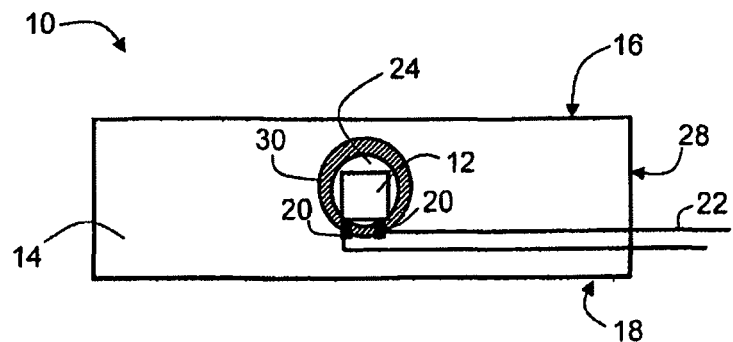

Other configurations of photoluminescent material 30 may also enable uniform illumination of substantially white light from apparatus 10. Referring to FIG. 2c, in an embodiment, photoluminescent material 30 is disposed at the interface between encapsulation 24 and waveguide material 14; alternatively, photoluminescent material 30 may be integrated (e.g., dispersed) within the encapsulation 24. In either case, light unconverted by photoluminescent material 30 passes therethrough and mixes with the portion of the light emitted by light-emitting source 12 converted by photoluminescent material 30, thus forming substantially white light that is emitted from at least a portion of surface 16. Moreover, the presence of photoluminescent material 30 at the interface between encapsulation 24 and waveguide material 14 may decrease or substantially eliminate deleterious back-scattering at the interface.

Figure 2D:
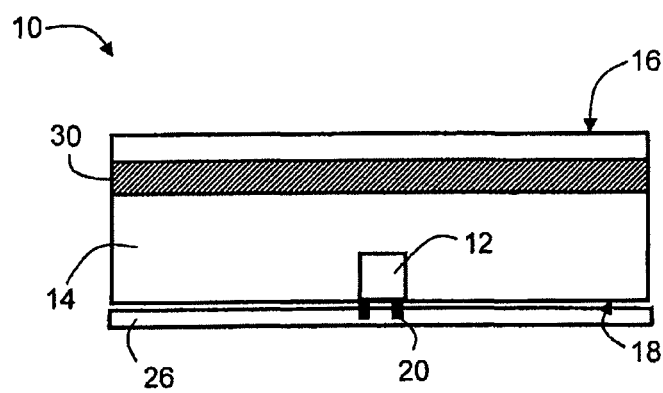

FIG. 2*d* illustrates an embodiment in which a layer of photoluminescent material 30 is disposed within waveguide material 14 between light-emitting source 12 and surface 16. In such embodiments, the layer of photoluminescent material 30 may be produced by, for example, deposition before a final upper layer of waveguide material 14 is applied, and may be disposed at any level between light-emitting source 12 and surface 16, including proximate (and even in direct physical contact with) surface 16. At least a portion of photoluminescent material 30 may be within a direct line-of-sight of light-emitting source 12.

Figure 2E:
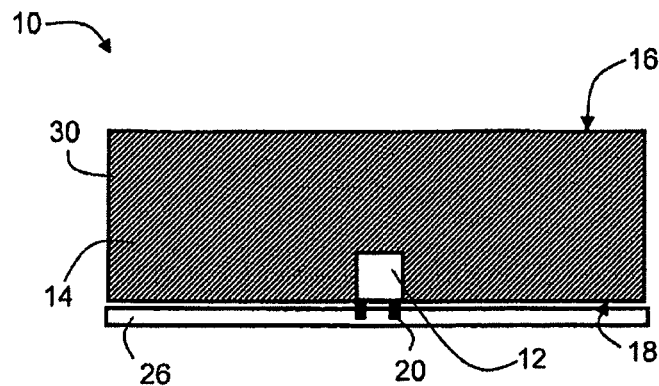
Figure 2F:
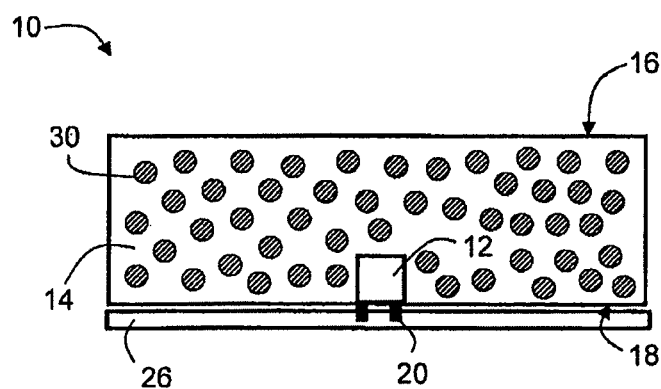

Referring to FIGS. 2*e* and 2*f*, photoluminescent material 30 may be formed as part of the "matrix" of waveguide material 14, thereby being distributed throughout substantially all of waveguide material 14. For example, molecules of photoluminescent material may be dissolved or dispersed (FIG. 2*e*), or particles of photoluminescent material may be dispersed (FIG. 2*f*), within the waveguide material 14 (or components thereof) prior to curing the material into a solid form of waveguide material 14. Because the composite waveguide and photoluminescent material may be applied as a coating or molded in a single step, devices based on this configuration may be less complicated to fabricate than, for example, configurations including localized layer(s) of photoluminescent material 30. In the embodiment illustrated in FIG. 2*f*, the particles of photoluminescent material 30 may also function as an impurity 70 (as described below with reference to FIGS. 7*a* and 7*b*).

In embodiments of the invention in which photoluminescent material 30 is embedded within waveguide material 14, e.g., the embodiments of FIG. 2*c*-2*f*, photoluminescent material 30 may be less susceptible to damage during assembly and use of waveguide material 14 as an (or a portion of an) illumination apparatus. Photoluminescent materials disposed on an outer surface of an illumination structure may be more susceptible to deterioration, flaking, or other damage, thus compromising the ability of the illumination structure to emit light having uniform brightness and color.

Many types of phosphorescent and fluorescent substances are suitable for photoluminescent material 30. Representative examples include, without limitation, the phosphors disclosed in U.S. Pat. Nos. 5,813,752, 5,813,753, 5,847,507, 5,959,316, 6,155,699, 6,351,069, 6,501,100, 6,501,102, 6,522,065, 6,614,179, 6,621,211, 6,635,363, 6,635,987, 6,680,004, 6,765,237, 6,853,131, 6,890,234, 6,917,057, 6,939,481, 6,982,522, 7,015,510, 7,026,756, 7,045,826, and 7,005,086, the entire disclosure of each of which is incorporated by reference herein.

The various possible light profile options make the apparatus of the present embodiments suitable for providing illumination in many applications. Representative examples of uses of apparatus 10, include, without limitation, architectural highlighting, decorative lighting, medical lighting, signage for displaying commercial or decorative expressions, visual guidance (e.g., landing strips, aisles), displays, exhibit lighting, roadway lighting, automotive lighting, and the like. In certain embodiments, the flexibility of the waveguide material makes apparatus 10 attachable to many surfaces, including, without limitation, walls of a building (either external or internal), windows, boxes (e.g., jewelry boxes), toys, and the like.

Although apparatus 10 may be designed to provide any light profile, for many applications it is desired to construct apparatus 10 to provide substantially uniform illumination. The apparatus of the present embodiments may provide illumination characterized by a uniformity of at least 70%, more preferably at least 80%, even more preferably at least 90%. This is particularly useful when apparatus 10 is incorporated in a backlight unit of a passive display device.

White light illumination may be provided in more than one way. In one embodiment, the waveguide material is embedded with red light sources, green light sources, blue light sources, and optionally light sources of other colors (e.g., orange, yellow, green-yellow, cyan, amber, blue-violet) that are distributed such that the combination of red light, green light, blue light, and optionally light in the other colors appears as substantially uniform white light across the area of surface 16 or a portion thereof.

In another embodiment, material 30 converts the light emitted by light sources 12 to substantially white light, e.g., using a dichromatic, trichromatic, tetrachromatic, or multichromatic approach.

For example, a blue-yellow dichromatic approach may be employed, in which blue light sources (e.g., bare dies of InGaN with a peak emission wavelength at about 460 nm), may be distributed in waveguide material 14, and material 30 may be made of phosphor molecules with absorption spectra in the blue range and emission spectra extending to the yellow range (e.g., cerium-activated yttrium aluminum garnet, or strontium silicate europium). Since the scattering angle of light sharply depends on the frequency of the light (fourth-power dependence for Rayleigh scattering, or second-power dependence for Mie scattering), the blue light generated by the blue light sources is efficiently diffused in the waveguide material and exits, substantially uniformly, through surface 16 into layer 30. Material 30, which has no preferred directionality, emits light in its emission spectrum and complements the blue light which is not absorbed to white light.

In other dichromatic configurations, ultraviolet light sources (e.g., bare dies of GaN, AlGaN and/or InGaN with a peak emission wavelengths between 360 nm and 420 nm), may be distributed in waveguide material 14. Light of such ultraviolet light sources is efficiently diffused in the waveguide material and exits, substantially uniformly, through surface 16. To provide substantially white light, two photoluminescent layers are preferably disposed on surface 16. One layer may be characterized by an absorption spectrum in the ultraviolet range and emission spectrum in the orange range (with peak emission wavelength from about 570 nm to about 620 nm), and another layer characterized by an absorption spectrum in the ultraviolet range and emission spectrum in the blue-green range (with peak emission wavelength from about 480 nm to about 500 nm). The orange light and blue-green light emitted by the two photoluminescent layers blend to appear as white light to an observer. Since the light emitted by the ultraviolet light sources is above or close to the end of visual range, it is not seen by the observer. The two photoluminescent layers are preferably disposed one on top of the other (in direct physical contact) to improve the uniformity. Alternatively, a single layer having two types of photoluminescent materials with the above emission spectra may be utilized.

In another embodiment, a trichromatic approach is employed. For example, blue light sources may be distributed in the waveguide material as described above, with two photoluminescent layers deposited on surface 16. A first photoluminescent layer may include or consist essentially of phosphor molecules with absorption spectra in the blue range and emission spectra extending to the yellow range as described above, and a second photoluminescent layer may include or consist essentially of phosphor molecules with absorption spectra in the blue range and emission spectra extending to the red range (e.g., cerium-activated yttrium aluminum garnet doped with a trivalent ion of praseodymium, or europiumactivated strontium sulphide). The unabsorbed blue light, the yellow light, and the red light blend to appear as white light to an observer.

Also contemplated is a configuration is which light sources with different emission spectra are distributed and several photoluminescent layers are utilized, such that the absorption spectrum of each photoluminescent layer overlaps one of the emission spectra of the light sources, and all of the emitted colors (of the light sources and the photoluminescent layers) blend to appear as white light. The advantages of such a multi-chromatic configuration are that it provides high-quality white balance because it allows better control on the various spectral components of the light in a local manner across the surface of the illumination apparatus, and delivers a high color rendering index (CRI) for general lighting applications.

The color composite of the white output light may depend on the intensities and spectral distributions of the emanating light emissions. These depend on the spectral characteristics and spatial distribution of the light sources, and, in the embodiments in which one or more photoluminescent layers are employed, on the spectral characteristics of the photoluminescent layer(s) and the amount of unabsorbed light. The amount of light that is unabsorbed by the photoluminescent layer(s) is in turn a function of the thickness of the photoluminescent layer(s), the density of photoluminescent material(s), and the like. By judiciously selecting the emission spectra of light-emitting source 12 and optionally the thickness, density, and spectral characteristics (absorption and emission spectra) of material 30, apparatus 10 may be made to serve as an illumination surface (either planar or non planar, either stiff or flexible) that provides substantially uniform white light.

In any of the above embodiments, the "whiteness" of the light may be tailored according to the specific application for which apparatus 10 is used. For example, when apparatus 10 is incorporated as a backlight of an LCD device, the spectral components of the light provided by apparatus 10 may be selected in accordance with the spectral characteristics of the color filters of the liquid-crystal panel. In other words, since a typical liquid-crystal panel comprises an arrangement of color filters operating at a plurality of distinct colors, the white light provided by apparatus 10 includes at least the distinct colors of the filters. This configuration significantly improves the optical efficiency as well as the image quality provided by the LCD device, because the optical losses due to mismatch between the spectral components of the backlight unit and the color filters of the liquid crystal panel are reduced or eliminated.

Thus, in an embodiment in which white light is achieved by light sources emitting different colors of light (e.g., red light, green light, and blue light), the emission spectra of the light sources are preferably selected to substantially overlap the characteristic spectra of the color filters of an LCD panel. In an embodiment in which apparatus 10 is supplemented by one or more photoluminescent layers, the emission spectra of the photoluminescent layers and, optionally, the emission spectrum or spectra of the light sources, are preferably selected to overlap the characteristic spectra of the color filters of an LCD panel. Typically, the overlap between a characteristic emission spectrum and a characteristic filter spectrum is about 70% spectral overlap, more preferably about 80% spectral overlap, even more preferably about 90%.

Figure 3:
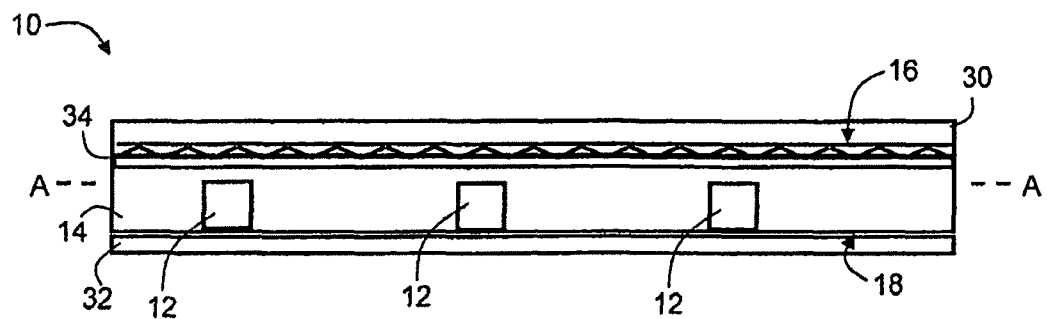
FIG. 3 is a section view of the apparatus, in a preferred embodiment in which the apparatus includes a structured film.

Reference is now made to FIG. 3, which is a section view along line A-A of FIG. 1a, according to a preferred embodiment in which apparatus 10 includes a structured film 34. Structured film 34 may be, for example, a brightness-enhancement film, and it may be disposed on or embedded in waveguide material 14. Film 34 collimates the light emitted from light sources 12, thereby increasing the brightness of the illumination provided by apparatus 10. This embodiment is particularly useful when apparatus 10 is used for a backlight of an LCD device. The increased brightness enables a sharper image to be produced by the liquid-crystal panel and allows operating the light sources at low power to produce a selected brightness. The structured film may operate according to principles and operation of prisms. Thus, light rays arriving at the structured film at small angles relative to the normal to the structured film are reflected, while other light rays are refracted. The reflected light rays continue to propagate and diffuse in the waveguide material until they arrive at the structured film at a sufficiently large angle. In an embodiment in which apparatus 10 includes a reflecting surface 32 it prevents the light which is reflected from film 34 from exiting through surface 18. Structured films are known in the art and are found in the literature, see, e.g., International Patent Application Publication No. WO 96/023649, the entire disclosure of which is incorporated by reference herein.

Figure 4:
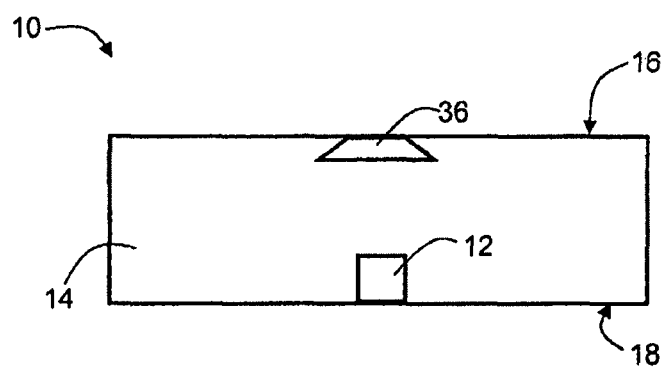
FIG. 4 is a fragmentary view of the apparatus in a preferred embodiment in which the apparatus includes one or more embedded optical elements for enhancing the diffusion of light.

Reference is now made to FIG. 4, which is a fragmentary view schematically illustrating an embodiment in which apparatus 10 includes one or more optical elements 36 embedded waveguide material 14 for enhancing the diffusion of light. One skilled in the art will recognize that several components of apparatus 10 have been omitted from FIG. 4 for clarity of presentation. Element 36 may be embedded in material 14 near surface 16 or at any other location.

In various exemplary embodiments of the invention, element 36 operates as an angle-selective light-transmissive element. Specifically, element 36 is preferably configured to reflect light striking element 36 at a predetermined range of angles (e.g., ±10° from the normal to surface 16), and transmit light striking element 36 at other angles. Element 36 may be a mini prism, a structured surface similar to surface 34 above, a microlens, or the like. Element 36 may be embedded in material 14 during the manufacturing process of material 14 in parallel to the embedding of light source 12 or any other component. The size of element 36 may be selected to allow the collection of light rays at the predetermined range of angles and therefore may depend on the distance between surface 16 and light source 12. Thus, in embodiments in which light source 12 is embedded near surface 18, element 36 has a larger size compared to its size in embodiments in which light source 12 is embedded in the bulk of material 14.

Figure 5:
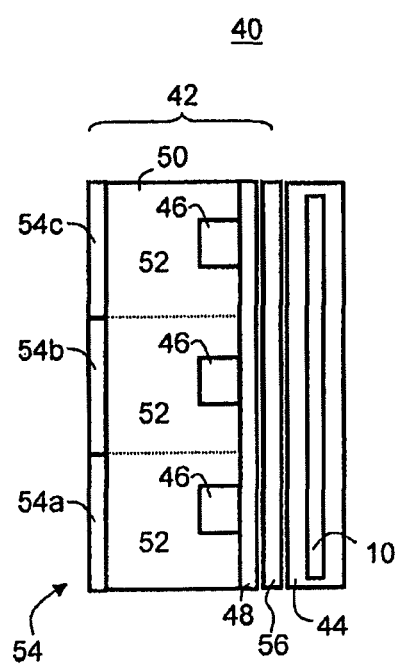
FIG. 5 is a block diagram schematically illustrating a liquid crystal display device, according to various exemplary embodiments of the present invention.

Reference is now made to FIG. 5, which is a block diagram schematically illustrating a liquid crystal display device 40, according to various exemplary embodiments of the present invention. Device 40 may include or consist essentially of a liquid-crystal panel 42 and a backlight unit 44. Backlight unit 44 may include or consist essentially of illumination apparatus 10 as further detailed hereinabove. Several components of apparatus 10 have been omitted from FIG. 5 for clarity of presentation, but one of ordinary skill in the art, provided with the details described herein, would know how to construct apparatus 10 according to the various exemplary embodiments described above.

Panel 42 may include a matrix of thin-film transistors 46 fabricated on a substrate 48 of glass or another substantially transparent material. A liquid-crystal film 50 may be disposed over substrate 48 and transistors 46. A polarizer 56 may be disposed on a backside of substrate 48. Transistors 16 may be addressed by gate lines (not shown) disposed on the substrate 48 during the fabrication of transistors 16 as is well known in the art. Each particular transistor conducts electrical current and may charge film 50 in its vicinity. The charging of the liquid-crystal film alters the opacity of the film, and effects a local change in light transmission of the liquid-crystal film 20. Hence, transistors 16 define display cells 52 (e.g., pixels) in liquid-crystal film 50. Typically, the opacity of each display cell is changed to one of several discrete opacity levels to implement an intensity gray scale. Thus, the display cells serve as grayscale picture elements. However, pixel opacity also may be controlled in a continuous analog fashion or a digital (on/off) fashion.

Color-selective filters 54 may be distributed on cells 52 across the display area of panel 42 to produce a color display. Typically, but not obligatorily, there are three types of color filters (designated in FIG. 5 by 54*a*, 54*b*, and 54*c*) where each filter allows transmission of one of the three primary additive colors: red, green and blue. The schematic block diagram of FIG. 5 illustrates a single three-component cell that includes a first component color (e.g., red output by cell 52 covered by filter 54*a*), a second component color (e.g., green output by cell 52 covered by filter 54*b*), and a third component color (e.g., blue output by the cell 52 covered by the filter 54*c*), which are selectively combined or blended to generate a selected color.

In operation, backlight unit 44 may produce a substantially uniform white illumination as detailed above, and polarizer 56 may optimize the light polarization with respect to polarization properties of liquid-crystal film 20. The opacity of the cells 52 may be modulated using transistors 46 as detailed above to create a transmitted light intensity modulation across the area of device 40. Color filters 54 may colorize the intensity-modulated light emitted by the pixels to produce a color output. By selective opacity modulation of neighboring display cells 52 of the three color components, selected intensities of the three colors may be blended together to selectively control color light output. As is known in the art, selective blending of three primary colors such as red, green, and blue may generally produce a full range of colors suitable for color display purposes. Spatial dithering may be optionally and preferably used to provide further color blending across neighboring color pixels Display device 40 may be incorporated in may applications. Representative examples include, without limitation, a portable computer system (e.g., a laptop), a computer monitor, a personal digital assistant system, a cellular communication system (e.g., a mobile telephone), a portable navigation system, a television system, and the like.

Additional objects, advantages and features of the present embodiments will become apparent to one ordinarily skilled in the art upon examination of the following examples for constructing waveguide material 14, which are not intended to be limiting. According to a preferred embodiment of the present invention, waveguide material 14 includes or consists essentially of a polymeric material. The polymeric material may optionally include or consist essentially of a rubbery or rubber-like material. According to a preferred embodiment of the present invention, material 14 is formed by dip-molding in a dipping medium, for example, a hydrocarbon solvent in which a rubbery material is dissolved or dispersed. The polymeric material optionally and preferably has a predetermined level of cross-linking, which is preferably between particular limits. The cross-linking may optionally be physical cross-linking, chemical cross-linking, or a combination thereof. A non-limiting illustrative example of a chemically cross-linked polymer includes or consists essentially of cross-linked polyisoprene rubber. A non-limiting illustrative example of a physically cross-linked polymer includes or consists essentially of cross-linked block co-polymers or segmented co-polymers, which may be cross-linked due to micro-phase separation, for example. Material 14 is optionally cross-linked through application of radiation, such as, but not limited to, electron-beam radiation and/or electromagnetic radiation.

Although not limited to rubber itself, the material optionally and preferably has the physical characteristics of rubber, such as parameters relating to tensile strength and elasticity, which are well known in the art. For example, material 14 is preferably characterized by a tensile set value below approximately 5%. The tensile set value generally depends on the degree of cross-linking and is a measure of the ability of flexible material 14, after having been stretched either by inflation or by an externally applied force, to return to its original dimensions upon deflation or removal of the applied force.

The tensile set value may be determined, for example, by placing two reference marks on a strip of material 14 and noting the distance between them along the strip, stretching the strip to a certain degree (for example, by increasing its elongation to approximately 90% of its expected ultimate elongation), holding the stretch for a certain period of time, e.g., one minute, then releasing the strip and allowing it to return to its relaxed length, and re-measuring the distance between the two reference marks. The tensile set value is then determined by comparing the measurements before and after the stretch, subtracting one from the other, and dividing the difference by the measurement taken before the stretch. In a preferred embodiment, using a stretch of approximately 90% of its expected ultimate elongation and a holding time of one minute, the preferred tensile set value is less than approximately 5%. Also contemplated are materials having about 30% plastic elongation and less then approximately 5% elastic elongation.

The propagation and diffusion of light through material 14 may be done in any way known in the art, such as, but not limited to, total internal reflection, graded refractive index, and band gap optics. Additionally, polarized light may be used, in which case the propagation of the light may be facilitated by virtue of the reflective coefficient of material 14. For example, a portion of material 14 may be made of a dielectric material having a reflective coefficient sufficient to trap the light within at least a predetermined region.

In any event, material 14 is preferably designed and constructed such that at least a portion of the light propagates therethrough in a plurality of directions, so as to allow the diffusion of the light in material 14 and the emission of the light through more than one point in surface 16.

Figure 6A:
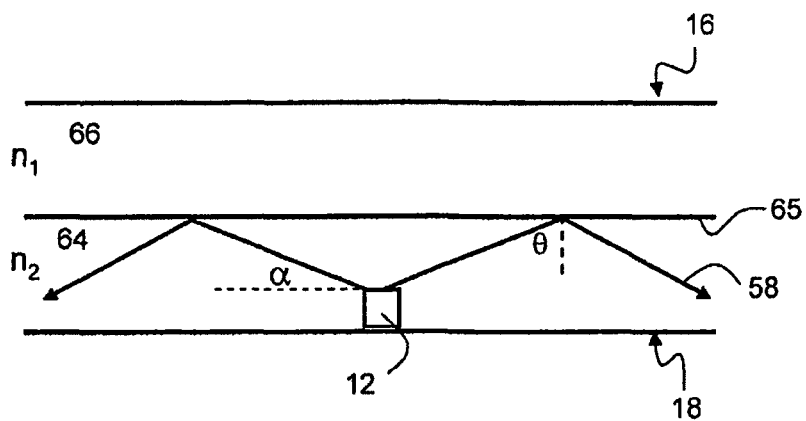
FIG. 6a is a schematic illustration of the waveguide material in a preferred embodiment in which two layers are employed.
Figure 6B:
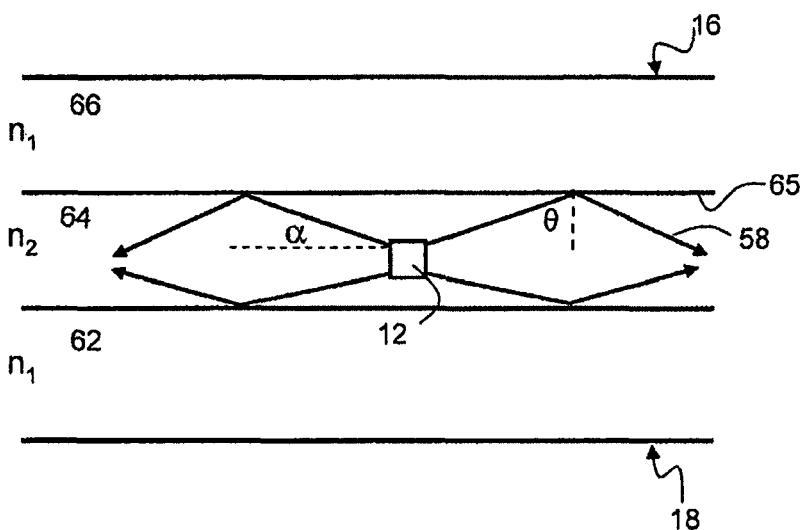
FIGS. 6b-6c are schematic illustrations of the waveguide material in preferred embodiments in which three layers are employed.
Figure 6C:
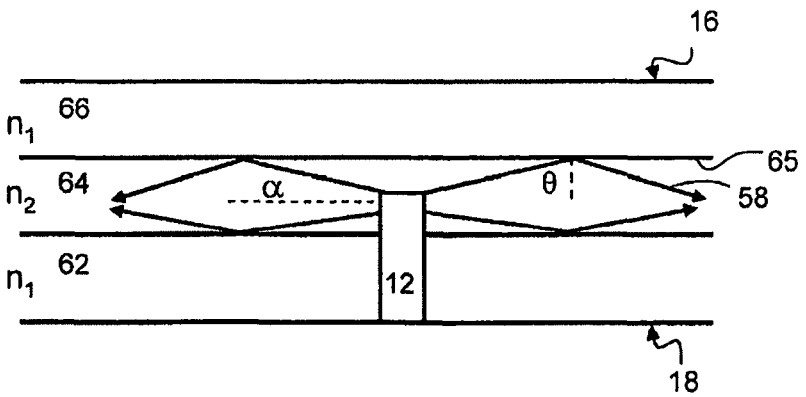

Reference is now made to FIGS. 6*a*-6*b*, which illustrate material 14 in an embodiment in which total internal reflection is employed. In this embodiment material 14 includes or consists essentially of a first layer 62 and a second layer 64. Preferably, the refractive index of layer 66, designated in FIGS. 6*a*-6*b* by $n_1$, is smaller than the refractive index $n_2$ of layer 64. In such a configuration, when the light, shown generally at 58, impinges on internal surface 65 of layer 64 at an impinging angle θ, which is larger than the critical angle, $\theta_c \equiv \sin^{-1}(n_1/n_2)$, the light energy is trapped within layer 64, and the light propagates therethrough at a predetermined propagation angle, α. FIGS. 6*b*-6*c* schematically illustrate embodiments in which material 14 has three layers, 62, 64 and 66, where layer 64 is interposed between layer 62 and layer 66. In such embodiments, the refractive indices of layers 62 and 64 are smaller than the refractive index of layer 64. As shown, light source 12 may be embedded in layer 64 (see FIG. 6*b*) or it may be embedded in a manner such that it extends over more than one layer (e.g., layers 62 and 64; see FIG. 6*c*).

The light may also propagate through waveguide material 14 when the impinging angle is smaller than the critical angle, in which case one portion of the light is emitted and the other portion thereof continues to propagate. This is the case when material 14 includes or consists essentially of dielectric or metallic materials, where the reflective coefficient depends on the impinging angle θ.

The propagation angle α, is approximately ±(π/2−θ), in radians. α depends on the ratio between the indices of refraction of the layers. Specifically, when $n_2$ is much larger than $n_1$, α is large, whereas when the ratio $n_2/n_1$ is close to, but above, unity, α is small. According to a preferred embodiment of the present invention, the thicknesses of the layers of material 14 and the indices of refraction are selected such that the light propagates in a predetermined propagation angle. A typical thickness of each layer is from about 10 μm to about 3 mm, more preferably from about 50 μm to about 500 μm, most preferably from about 100 μm to about 200 μm. The overall thickness of material 14 may depend on the height of light source 12. For example, when light source 12 is an LED device of size 0.6 mm (including the LED package), the height of material 14 is preferably from about 0.65 mm to about 0.8 mm. When light source 12 is a bare die of size 0.1 mm, the height of material 14 is preferably from about 0.15 mm to about 0.2 mm.

The difference between the indices of refraction of the layers is preferably selected in accordance with the desired propagation angle of the light. According to a preferred embodiment of the present invention, the indices of refraction are selected such that propagation angle is from about 2 degrees to about 15 degrees. For example, layer 64 may be made of poly(cis-isoprene), having a refractive index of about 1.52, and layers 62 and 66 may be made of Poly(dimethyl siloxane) having a refractive index of about 1.45, so that $\Delta n = n_2 - n_1 \approx 0.07$ and $n_2/n_1 \approx 0.953$, corresponding to a propagation angle of about ±19 degrees.

The emission of the light from surface 16 of material 14 may be achieved in more than one way. Broadly speaking, one or more of the layers of waveguide material 14 preferably include at least one additional component 71 (not shown, see FIGS. 7a-7d) designed and configured so as to allow the emission of the light through the surface. Following are several examples for the implementation of component 71, which are not intended to be limiting.

Figure 7A:
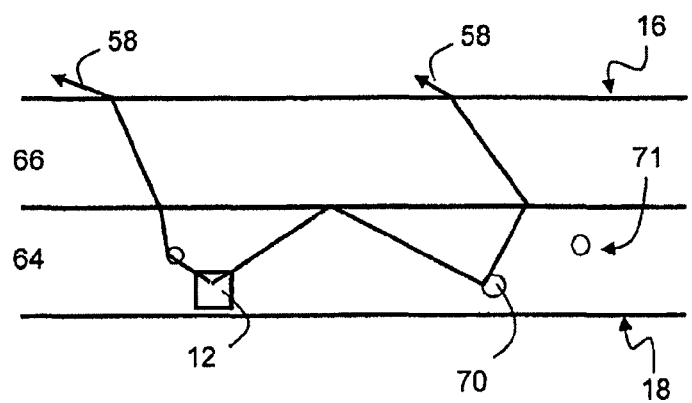
FIG. 7a is a schematic illustration of the waveguide material in a preferred embodiment in which at least one impurity is used for scattering light.

Referring to FIG. 7a, in one embodiment, component 71 is implemented as at least one impurity 70, present in second layer 64 and capable of emitting light, so as to change the propagation angle of the light. Impurity 70 may serve as a scatterer, which, as stated, may scatter radiation in more than one direction. When the light is scattered by impurity 70 in such a direction that the impinging angle θ, which is below the aforementioned critical angle $\theta_c$, no total internal reflection occurs and the scattered light is emitted through surface 16. According to a preferred embodiment of the present invention, the concentration and distribution of impurity 70 is selected such that the scattered light is emitted from a predetermined region of surface 16. More specifically, in regions of waveguide material 14 where larger portions of the propagated light are to be emitted through the surface, the concentration of impurity 70 is preferably large, while in regions where a small portion of the light is to be emitted the concentration of impurity 70 is preferably smaller.

As will be appreciated by one ordinarily skilled in the art, the energy trapped in waveguide material 14 decreases each time a light ray is emitted through surface 16. On the other hand, it is often desired to use material 14 to provide a uniform surface illumination. Thus, as the overall amount of energy decreases with each emission, a uniform surface illumination may be achieved by gradually increasing the ratio between the emitted light and the propagated light. According to a preferred embodiment of the present invention, the increasing emitted/propagated ratio is achieved by an appropriate selection of the distribution of impurity 70 in layer 64. More specifically, the concentration of impurity 70 is preferably an increasing function (e.g., step-wise or continuous) of the optical distance which the propagated light travels.

Optionally, impurity 70 may include or consist essentially of any object that scatters light and that is incorporated into the material, including but not limited to, beads, air bubbles, glass beads or other ceramic particles, rubber particles, silica particles and so forth, any of which may optionally be fluorescent particles or biological particles, such as, but not limited to, liposomes.

Figure 7B:
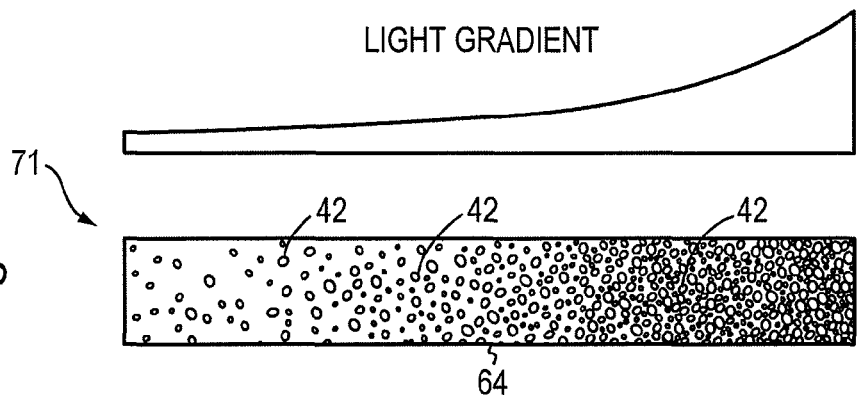
FIG. 7b is a schematic illustration of the waveguide material in a preferred embodiment in which the impurity comprises a plurality of particles having a gradually increasing concentration.

FIG. 7b further details the presently preferred embodiment of the invention. In FIG. 7b, impurity 70 is optionally and preferably implemented as a plurality of particles 42, distributed in an increasing concentration so as to provide a light gradient. Particles 42 are preferably organized so as to cause light to be transmitted with substantially lowered losses through scattering of the light. Particles 42 may optionally be implemented as a plurality of bubbles in a solid plastic portion, such as a tube. According to a preferred embodiment of the present invention, the approximate size of particles 42 is selected to selectively scatter a predetermined range of wavelengths of the light. More specifically, small particles may scatter small wavelengths and large particles may scatter both small and large wavelengths.

Particles 42 may also optionally act as filters, for example for filtering out particular wavelengths of light. Preferably, different types of particles 42 are used at different locations in waveguide material 14. For example, particles 42 that scatter a particular spectrum may preferably be used within waveguide material 14, at locations where the particular wavelength is to be emitted from waveguide material 14 to provide illumination.

According to a preferred embodiment of the present invention, impurity 70 is capable of producing different optical responses to different wavelengths of the light. The different optical responses may be realized as different emission angles, different emission wavelengths, and the like. For example, different emission wavelengths may be achieved by implementing impurity 70 as beads each having predetermined combination of color-components, e.g., a predetermined combination of fluorophore molecules.

When a fluorophore molecule embedded in a bead absorbs light, electrons are boosted to a higher energy shell of an unstable excited state. During the lifetime of excited state (typically 1-10 nanoseconds) the fluorophore molecule undergoes conformational changes and is also subject to a multitude of possible interactions with its molecular environment. The energy of the excited state is partially dissipated, yielding a relaxed singlet excited state from which the excited electrons fall back to their stable ground state, emitting light of a specific wavelength. The emission spectrum is shifted towards a longer wavelength than its absorption spectrum. The difference in wavelength between the apex of the absorption and emission spectra of a fluorophore (also referred to as the Stokes shift), is typically small.

Thus, in an embodiment, the wavelength (color) of the emitted light is controlled by the type(s) of fluorophore molecules embedded in the beads. Other objects having similar or other light-emission properties may be also be used. Representative examples include, without limitation, fluorochromes, chromogenes, quantum dots, nanocrystals, nanoprisms, nanobarcodes, scattering metallic objects, resonance light-scattering objects, and solid prisms.

Figure 7C:
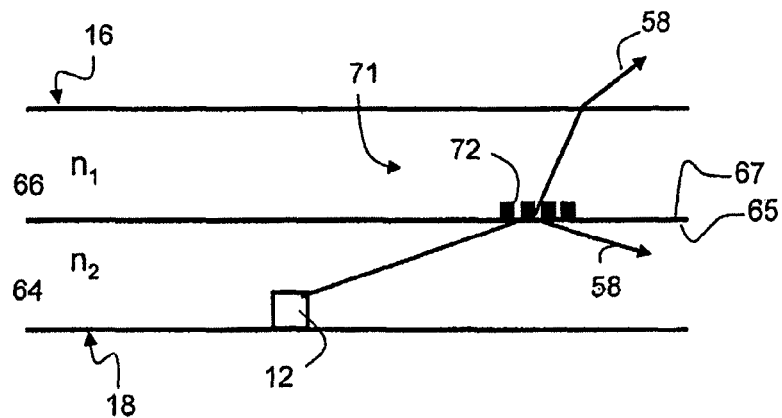
FIG. 7c is a schematic illustration of the waveguide material in a preferred embodiment in which one layer thereof is formed with one or more diffractive optical elements for at least partially diffracting the light.

Referring to FIG. 7c, in another embodiment, component 71 is implemented as one or more diffractive optical elements 72 that at least partially diffract the light. Thus, propagated light reaches optical element 72, where a portion of the light energy is coupled out of material 14, while the remnant energy is redirected through an angle, which causes it to continue its propagation through layer 64. Optical element 70 may be realized in many ways, including, without limitation, non-smooth surfaces of layer 64, a mini-prism or grating formed on internal surface 65 and/or external surface 67 of layer 64. Diffraction gratings are known to allow both redirection and transmission of light. The angle of redirection is determined by an appropriate choice of the period of the diffraction grating often called "the grating function." Furthermore, the diffraction efficiency controls the energy fraction that is transmitted at each strike of light on the grating. Hence, the diffraction efficiency may be predetermined so as to achieve an output having predefined light intensities; in particular, the diffraction efficiency may vary locally for providing substantially uniform light intensities. Optical element 70 may also be selected such that the scattered light has a predetermined wavelength. For example, in an embodiment in which optical element 70 is a diffraction grating, the grating function may be selected to allow diffraction of a predetermined range of wavelengths.

Figure 7D:
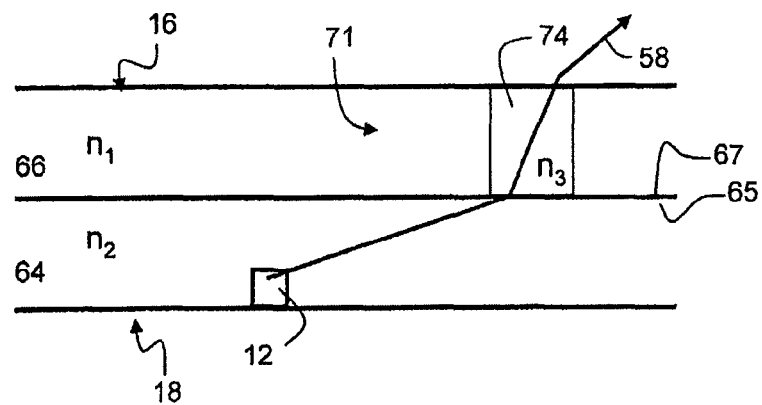
FIG. 7d is a schematic illustration of the waveguide material in a preferred embodiment in which one or more regions have different indices of refraction so as to prevent the light from being reflected.

Referring to FIG. 7d, in an additional embodiment, one or more regions 74 of layer 62 and/or layer 66 have different indices of refraction so as to prevent the light from being reflected from internal surface 65 of second layer 64. For example, denoting the index of refraction of region 74 by $n_3$, a skilled artisan would appreciate that when $n_3 > n_2$, no total internal reflection can take place, because the critical angle $\theta_c$ is only defined when the ratio $n_3/n_2$ does not exceed the value of 1. An advantage of this embodiment is that the emission of the light through surface 16 is independent on the wavelength of the light.

Figure 8:
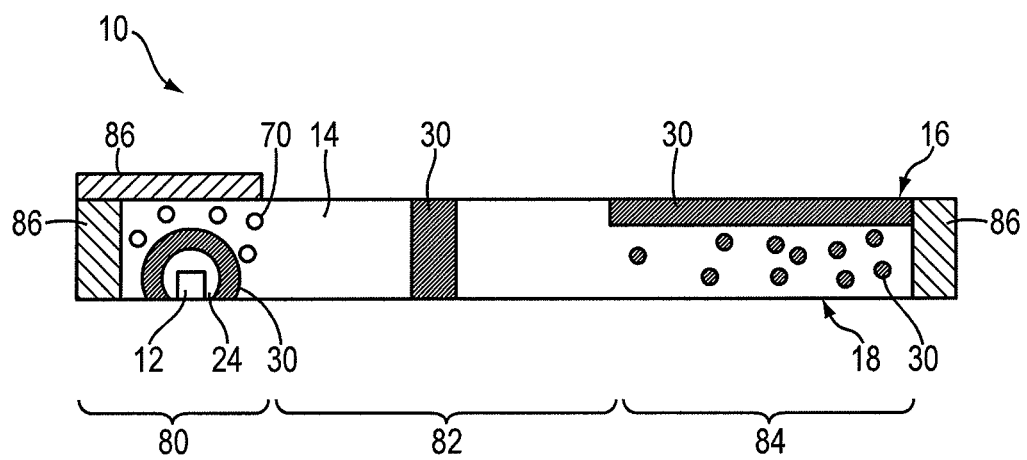
FIG. 8 is a schematic illustration of the waveguide material in a preferred embodiment in which photoluminescent material is within a direct line-of-sight of the light-emitting source.

Referring to FIG. 8, apparatus 10 may be shaped as a generally planar sheet, and may include or consist essentially of three discrete, spatially distinct regions, namely, in-coupling region 80, propagation region 82, and out-coupling region 84. One or more light-emitting sources 12 are preferably embedded within waveguide material 14, and may be surrounded by encapsulation 24. Apparatus 10 may also include one or more reflectors 86 which reflect light emitted by source 12 such that it remains confined within waveguide material 14 except in regions from which light is meant to be emitted, e.g., out-coupling region 84. Light emitted from source 12 is "coupled" into waveguide material 14 in in-coupling region 80 by, e.g., scattering off of one or more impurities 70. In this manner, light emitted from source 12 is redirected toward propagation region 82 and/or out-coupling region 84, e.g., in a direction generally perpendicular to the direction of light emission from light-emitting source 12. Propagation region 82 may be characterized by the near or complete absence of scattering impurities 70; thus, light merely propagates through propagation region 82 with substantially no emission through surface 16. Finally, light is emitted from surface 16 in out-coupling region 84, e.g., in a direction generally perpendicular to the propagation direction through propagation region 82 and/or generally parallel to a direction of light emission from light-emitting source 12. To this end, out-coupling region 84 may include a plurality of impurities 70, the size, type, and/or concentration of which may vary as a function of distance along out-coupling region 84 (as in, for example, FIG. 7b). Some or all of impurities 70 in out-coupling region 84 may include or consist essentially of photoluminescent material 30 (as further described below). The light emitted from out-coupling region 84 may be substantially uniform and/or substantially white. Apparatus 10 may additionally include one or more cladding layers (not shown) proximate or in direct physical contact with surfaces 16 and/or 18. The cladding layer(s) may facilitate prevention of unwanted light emission from one or more regions of surfaces 16 and/or 18. The cladding layers may include or consist essentially of a phosphor-encapsulating material (as described above), and may only contain a photoluminescent material 30 over out-coupling region 84 (such that only out-coupled light is partially or entirely color shifted, as described below). In some embodiments, the cladding, including or consisting essentially of a phosphor-encapsulating material, is present only over the out-coupling region 84.

As depicted in FIG. 8, an apparatus 10 having in-coupling region 80, propagation region 82, and out-coupling region 84 may also incorporate photoluminescent material 30 in any one or more of several possible configurations. While FIG. 8 depicts several of these configurations, embodiments of the invention may incorporate any of the configurations of photoluminescent material 30 singly or in combination with any number of others. Analogous to the configurations depicted in FIGS. 2a-2f, photoluminescent material 30 may be disposed at an interface between encapsulation 24 and waveguide material 14 and/or as a distinct layer or region within any portion of waveguide material 14 between light-emitting source 12 and surface 16 in out-coupling region 84. In other embodiments, photoluminescent material 30 may be present in the form of, e.g., particles, for example in out-coupling region 84. In such embodiments, photoluminescent material 30 may also facilitate the out-coupling of light through surface 16 in out-coupling region 84. In yet other embodiments (not pictured in FIG. 8 for clarity), photoluminescent material 30 may form a portion of the waveguide material 14 matrix (as also depicted in FIG. 2e) in any one or more of in-coupling region 80, propagation region 82, and out-coupling region 84. In any of the above-described embodiments of the invention, a portion or substantially all of photoluminescent material 30 is preferably within a direct line-of-sight of light-emitting source 12. Generally, photoluminescent material 30 may be disposed within waveguide material 14 in any one or more of in-coupling region 80, propagation region 82, and out-coupling region 84.

The above-described configurations and locations of photoluminescent material 30 may improve, e.g., the quantum efficiency (or other performance metric) thereof, and also enable the use of particular photoluminescent materials 30 that may degrade when the material is exposed to elevated temperatures, e.g., temperatures greater than approximately 50° C. Such placement(s) of photoluminescent material 30 prevents the temperature of the material from rising (or rising detrimentally) during operation due to, e.g., heat given off by light-emitting source 12—i.e., the photoluminescent material is disposed sufficiently remotely from the light-emitting source so as to be substantially unaffected by heat emitted by the light-emitting source. Instead, the temperature of at least a portion of photoluminescent material 30 may generally remain at the ambient temperature of the surroundings of apparatus 10. Generally, the temperature of photoluminescent material 30 may remain at least approximately 30° C., or even at least 100° C., less than the temperature of light-emitting source 12 during operation. Examples of desirable photoluminescent materials 30 include (Y, Gd)AG:Ce materials.

In an embodiment, the quantum efficiency of photoluminescent material 30 is only stable up to a temperature of approximately 50° C. However, in many configurations the temperature of the material remains lower than this level due to its placement within apparatus 10 (including, e.g., remotely located with respect to light-emitting source 12). In various embodiments, photoluminescent material 30 includes or consists essentially of one or more electroluminescent materials rather than (or in addition to) photoluminescent materials. Such electroluminescent materials may include or consist essentially of quantum dot materials and/or organic LED (OLED) materials. Suitable quantum dots may include or consist essentially of cadmium selenide.

During assembly of apparatus 10, elevated temperatures capable of damaging (e.g., degrading the quantum efficiency of) photoluminescent material 30 are often required when affixing or embedding light-emitting source 12 into apparatus 10. Judicious location of photoluminescent material 30 enables it to be provided within apparatus 10 prior to the addition of light-emitting source 12, thereby avoiding such damage. Furthermore, as noted above, the distance between the material 30 and the light-emitting source 12 may prevent the elevated temperatures from damaging the photoluminescent material during operation.

One deleterious effect that may occur when color shifting (or "converting" light from one wavelength to another) with a photoluminescent material is a loss of illumination efficacy due to one or more of three principal loss mechanisms. First, illumination efficacy may be lost due to Stokes-shift loss, which is the amount of energy lost when light is converted from a shorter wavelength to a longer one. Second, loss may arise from quantum-efficiency loss, i.e., a decrease in the number of photons emitted at the converted (e.g., longer) wavelength compared to the number of photons absorbed by the photoluminescent material. Finally, efficacy may be lost via scattering losses resulting from light being backscattered from the photoluminescent material and absorbed by the device package. Problematically, the use of some photoluminescent materials for color shifting may increase the magnitude of these losses, particularly when large amounts of the materials are utilized.

In various embodiments, apparatus 10 has a high color-rendering index (CRI) without significant decreases in illumination efficacy. In some embodiments, a high CRI is facilitated by color shifting via a thin layer (preferably having a thickness less than approximately 200 µm) that includes photoluminescent material 30 in the form of particles. The particles may have average diameters ranging from approximately 0.5 µm to approximately 50 µm. The thin layer may be located at, e.g., any of the various locations indicated for photoluminescent material 30 in FIGS. 2a-2d and FIG. 8. Such layers typically have very high quantum efficiency, minimizing quantum-efficiency losses. The photoluminescent material 30 tends to be dispersed over a fairly large area (e.g., compared with the thickness of the thin layer), decreasing the amount of energy absorption (and thus heat production) in the individual particles of photoluminescent material 30. Thus, photoluminescent material 30 exhibits small amounts of the heating that tends to reduce quantum efficiency.

Apparatus 10 may include a photoluminescent material 30 that includes or consists essentially of a plurality of quantum dots and/or nano-size phosphor particles. As utilized herein, "nano-size phosphor particles" refers to particles of photoluminescent material having an average diameter of less than approximately 1 µm, and more typically less than approximately 100 nm. The quantum dots utilized in various embodiments of the invention are generally crystalline semiconductor-based particles having an average diameter of less than approximately 1 µm, and more typically less than approximately 100 nm. In some embodiments, the quantum dots have average diameters ranging between approximately 5 nm and approximately 7 nm.

The use of quantum dots and/or nano-size phosphor particles as a photoluminescent material increases the CRI of apparatus 10 without significant decreases in illumination efficacy primarily because scattering losses are minimized. So long as the quantum dots and/or nano-size phosphor particles have an average diameter smaller than the wavelength of the incident light to be converted, scattering losses are generally minimal or absent entirely. However, the use of nano-size phosphor particles may lead to increased quantum-efficiency losses due to the large surface area-to-volume ratio of the particles, as well as the fact that surface states of these particles tend to be non-radiative (and thus do not contribute to light emission). However, various embodiments of the invention utilize nano-size phosphor particles having average diameters of less than approximately 3 nm, or even less than approximately 2 nm. As the average diameter of the particles decreases to such values, quantum efficiency thereof actually rises significantly, and quantum-efficiency losses are advantageously minimized.

Thus, embodiments of the invention feature a photoluminescent material 30 (e.g., located at any or all of the locations indicated in FIG. 8) that includes or consists essentially of a plurality of quantum dots and/or nano-size phosphor particles. The nano-size phosphor particles may have average diameters less than approximately 3 nm, or even less than approximately 2 nm. The photoluminescent material 30 including or consisting essentially of the quantum dots and/or nano-size phosphor particles may be present in apparatus 10 either instead of or in addition to any of the other types of photoluminescent material 30 described herein. For example, apparatus 10 may include a layer of photoluminescent material 30 including or consisting essentially of quantum dots and/or nano-size phosphor particles formed proximate and/or in direct contact with a layer of a different photoluminescent material 30 (e.g., in any of the locations indicated on FIG. 8). The photoluminescent material 30 including or consisting essentially of quantum dots and/or nano-size phosphor particles may also be dispersed among another photoluminescent material 30 present in the form of scattering particles (as described above). Apparatus 10 including a photoluminescent material 30 in the form of quantum dots and/or nano-size phosphor particles generally has a larger CRI than an equivalent illumination apparatus lacking such a photoluminescent material or including only a photoluminescent material in the form of larger particles or discrete layer(s).

The utilization of various types of photoluminescent material 30 (including, but not limited to quantum dots and/or nano-size phosphor particles) may also increase the CRI of an apparatus 10 including multiple light-emitting sources 12. In various schemes, color-mixing multiple light sources to form, e.g, white light, results in low CRI values. For example, color mixing with red, green, and blue LEDs typically results in CRI values of only 20-30 (on the CRI scale of 100). Generally, for illumination a light source should have a CRI of greater than approximately 70.

In various embodiments, apparatus 10 includes multiple light-emitting sources 12, and at least two, or even three, of the light-emitting sources 12 each emits light of a different wavelength (e.g., of a different visible color) from that emitted by the other light-emitting source(s) 12. For example, apparatus 10 may include light-emitting sources 12 emitting red, green, and blue light, and may include one or more of each. Apparatus 10 also includes a photoluminescent material 30 (e.g., in any or all of the locations described above and depicted in FIG. 8) that color shifts a portion of the light emitted from one or more of light-emitting sources 12. The color-shifted light combines with the light emitted from light-emitting sources 12 (including any remaining light color-shiftable by photoluminescent material 30 but not color shifted thereby, as well as any light not color-shiftable by photoluminescent material 30) to form light having a CRI value greater than 70, or even greater than 80. The mixture of light emitted from light-emitting sources 12 may be substantially white light even without the interaction with photoluminescent material 30, and may be substantially white thereafter (but with a higher CRI value). In an embodiment, apparatus 10 includes light-emitting sources emitting red, green, and blue light, and at least a portion of the blue light is converted into yellow light by photoluminescent material 30, thus forming white light with a high CRI value.

In order to increase color uniformity (i.e., uniformity of the color coordinates of emitted light arising from the mixing of the light of individual light sources emitting at different colors), typical schemes utilize LEDs that must be precisely wavelength-matched, requiring expensive and time-consuming "binning" procedures to individually select sets of LEDs. The binning procedures generally must select LEDs having wavelengths within approximately 5 nm of each other to form color-mixed light sources having repeatable uniformity values. Unfortunately, even such painstaking procedures may eventually fail, as the emission wavelength of light sources such as LEDs may change during the lifetime of the light source.

Such embodiments of the invention may be utilized to form a plurality of apparatuses 10 that emit light having substantially similar, or even identical, color coordinates and/or CRI values, even though the individual light-emitting sources 12 therein emit light at wavelengths differing by more than approximately 10 nm. For example, a first apparatus 10 may include red-, green-, and blue-emitting light-emitting sources 12, and a second apparatus 10 may include red-, green-, and blue-emitting light-emitting sources 12, at least one (or even all) of which emit at wavelength different by more than approximately 10 nm than that emitted by the corresponding light-emitting source in the first apparatus 10. However, both the first and second apparatuses 10 emit light (e.g., substantially white light) having color coordinates values differing by no more than 10%, no more than 5%, no more than 1%, or even less. The color coordinates values of each apparatus 10 may be the (x,y) chromaticity parameters, as defined by the standard of the International Commission on Illumination (CIE), which are functions of the CIE tristimulus values (X, Y, Z). The respective x and y parameters for each apparatus preferably differ by no more than 10%, no more than 5%, no more than 1%, or even less. Further, the respective x and y parameters for each apparatus may differ by no more than 0.002. Such repeatability is advantageously achieved via the use of photoluminescent material 30—the color mixing thereby "blurs" the difference in individual wavelengths by the addition of compensating color-shifted light. Each light-emitting source 12 may emit light having a "spread" or spectrum of wavelengths, and the wavelength referred to above may correspond to the emitted wavelength of maximum intensity.

As stated, flexible material 14 preferably includes or consists essentially of a polymeric material. The polymeric material may optionally include or consist essentially of natural rubber, a synthetic rubber, or a combination thereof. Examples of synthetic rubbers, particularly those which are suitable for medical articles and devices, are taught in U.S. Pat. No. 6,329,444, hereby incorporated by reference as if fully set forth herein with regard to such illustrative, non-limiting examples. The synthetic rubber in this patent is prepared from cis-1,4-polyisoprene, although of course other synthetic rubbers could optionally be used. Natural rubber may optionally be obtained from *Hevena brasiliensis* or any other suitable species. In some embodiments material 14 is not flexible, comprising or consisting essentially of, for example, polymethyl methacrylate and/or polycarbonate.

Other exemplary materials, which may optionally be used alone or in combination with each other, or with one or more of the above rubber materials, include but are not limited to, crosslinked polymers such as polyolefins, including but not limited to, polyisoprene, polybutadiene, ethylene-propylene copolymers, chlorinated olefins such as polychloroprene (neoprene) block copolymers, including diblock-, triblock-, multiblock- or star-block-, such as: styrene-butadiene-styrene copolymers, or styrene-isoprene-styrene copolymers (preferably with styrene content from about 1% to about 37%), segmented copolymers such as polyurethanes, polyether-urethanes, segmented polyether copolymers, silicone polymers, including copolymers, and fluorinated polymers and copolymers.

For example, optionally and preferably, the second layer may include or consist essentially of polyisoprene, while the first layer optionally and preferably may include or consist essentially of silicone. If a third layer is present, it also optionally and preferably may include or consist essentially of silicone.

According to an optional embodiment of the present invention, the flexible material is formed by dip-molding in a dipping medium. Optionally, the dipping medium may include or consist essentially of a hydrocarbon solvent in which a rubbery material is dissolved or dispersed. Also optionally, the dipping medium may include one or more additives selected from the group consisting of cure accelerators, sensitizers, activators, emulsifying agents, cross-linking agents, plasticizers, antioxidants, and reinforcing agents.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An illumination apparatus comprising:
  a substantially planar waveguide;
  at least one bare-die light-emitting diode (LED) embedded within the waveguide, wherein the waveguide (i) retains therein substantially all light emitted by the at least one LED, and (ii) causes the light to propagate and diffuse within the waveguide until the light is caused to exit from an exit region thereof; and
  spaced away from the at least one LED, at least one photoluminescent material for converting a wavelength of a portion of the light emitted by the at least one LED.

2. The illumination apparatus of claim 1, wherein the at least one photoluminescent material is configured to substantially eliminate back-scattering of light from the at least one photoluminescent material to the at least one LED.

3. The illumination apparatus of claim 2, wherein the waveguide comprises:
a discrete in-coupling region for receiving source light;
a discrete out-coupling region for emitting output light; and
a discrete propagation region, spatially distinct from the in-coupling and out-coupling regions, for propagating source light from the in-coupling region to the out-coupling region.

4. The illumination apparatus of claim 1, wherein the waveguide comprises:
a discrete in-coupling region for receiving source light;
a discrete out-coupling region for emitting output light; and
a discrete propagation region, spatially distinct from the in-coupling and out-coupling regions, for propagating source light from the in-coupling region to the out-coupling region.

5. The illumination apparatus of claim 4, wherein (i) the waveguide comprises top and bottom opposing surfaces, (ii) the exit region is at least a portion of the top surface of the waveguide, and (iii) the at least one LED is disposed proximate the bottom surface.

6. The illumination apparatus of claim 4, wherein (i) the waveguide comprises top and bottom opposing surfaces, (ii) the exit region is at least a portion of the top surface of the waveguide, and (iii) the at least one LED is disposed proximate a side surface spanning the top and bottom surfaces.

7. The illumination apparatus of claim 4, wherein the at least one photoluminescent material is disposed above and in mechanical contact but not in optical contact with the exit region.

8. The illumination apparatus of claim 1, further comprising a reflective material proximate a bottom surface of the waveguide.

9. The illumination apparatus of claim 8, wherein the at least one photoluminescent material is disposed above and in mechanical contact but not in optical contact with the exit region.

10. The illumination apparatus of claim 9, wherein (i) the exit region is at least a portion of a top surface of the waveguide opposite the bottom surface, and (ii) the at least one LED is disposed proximate the bottom surface.

11. The illumination apparatus of claim 9, wherein (i) the exit region is at least a portion of a top surface of the waveguide opposite the bottom surface, and (ii) the at least one LED is disposed proximate a side surface spanning the top and bottom surfaces.

12. The illumination apparatus of claim 8, wherein (i) the exit region is at least a portion of a top surface of the waveguide opposite the bottom surface, and (ii) the at least one LED is disposed proximate the bottom surface.

13. The illumination apparatus of claim 8, wherein (i) the exit region is at least a portion of a top surface of the waveguide opposite the bottom surface, and (ii) the at least one LED is disposed proximate a side surface spanning the top and bottom surfaces.

14. The illumination apparatus of claim 1, wherein (i) the waveguide comprises top and bottom opposing surfaces, (ii) the exit region is at least a portion of the top surface of the waveguide, and (iii) the at least one LED is disposed proximate the bottom surface.

15. The illumination apparatus of claim 1, wherein (i) the waveguide comprises top and bottom opposing surfaces, (ii) the exit region is at least a portion of the top surface of the waveguide, and (iii) the at least one LED is disposed proximate a side surface spanning the top and bottom surfaces.

16. The illumination apparatus of claim 1, wherein light emitted from the exit region has a uniformity of at least 70%.

17. The illumination apparatus of claim 1, wherein unconverted light from the at least one LED mixes with light converted by the at least one photoluminescent material to produce substantially white light.

18. The illumination apparatus of claim 1, wherein the waveguide comprises top and bottom opposing surfaces, and further comprising at least one reflector on a side surface spanning the top and bottom surfaces.

19. The illumination apparatus of claim 1, further comprising at least one electrical contact extending from the at least one LED outside of the waveguide.

20. The illumination apparatus of claim 1, wherein the at least one photoluminescent material is disposed within the waveguide proximate the at least one LED.

21. The illumination apparatus of claim 20, wherein the waveguide comprises:
a discrete in-coupling region for receiving source light;
a discrete out-coupling region for emitting output light; and
a discrete propagation region, spatially distinct from the in-coupling and out-coupling regions, for propagating source light from the in-coupling region to the out-coupling region.

22. The illumination apparatus of claim 20, wherein (i) the waveguide comprises top and bottom opposing surfaces, (ii) the exit region is at least a portion of the top surface of the waveguide, and (iii) the at least one LED is disposed proximate the bottom surface.

23. The illumination apparatus of claim 20, wherein (i) the waveguide comprises top and bottom opposing surfaces, (ii) the exit region is at least a portion of the top surface of the waveguide, and (iii) the at least one LED is disposed proximate a side surface spanning the top and bottom surfaces.

24. The illumination apparatus of claim 20, wherein light emitted from the exit region has a uniformity of at least 70%.

25. The illumination apparatus of claim 20, wherein unconverted light from the at least one LED mixes with light converted by the at least one photoluminescent material to produce substantially white light.

26. The illumination apparatus of claim 20, wherein the waveguide comprises top and bottom opposing surfaces, and further comprising at least one reflector on a side surface spanning the top and bottom surfaces.

27. The illumination apparatus of claim 20, further comprising at least one electrical contact extending from the at least one LED outside of the waveguide.

28. The illumination apparatus of claim 1, wherein at least a portion of the at least one photoluminescent material is disposed along an edge of the waveguide, and further comprising a reflector disposed at the edge of the waveguide.

* * * * *